(12) United States Patent
Uluyol et al.

(10) Patent No.: US 9,157,832 B2
(45) Date of Patent: Oct. 13, 2015

(54) METHOD AND SYSTEM FOR DETECTING INCIPIENT BEARING FAILURES

(75) Inventors: Onder Uluyol, Fridley, MN (US); Chris Hickenbottom, Phoenix, AZ (US); Kyusung Kim, Plymouth, MN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1117 days.

(21) Appl. No.: 12/790,340

(22) Filed: May 28, 2010

(65) Prior Publication Data

US 2011/0224917 A1 Sep. 15, 2011

Related U.S. Application Data

(60) Provisional application No. 61/313,370, filed on Mar. 12, 2010.

(51) Int. Cl.
*G01B 5/30* (2006.01)
*G01M 13/04* (2006.01)
*G06F 19/00* (2011.01)
*G07C 3/00* (2006.01)
*G01H 3/00* (2006.01)
*G01H 1/00* (2006.01)
(Continued)

(52) U.S. Cl.
CPC .............. *G01M 13/045* (2013.01); *G01H 1/00* (2013.01); *G01H 3/00* (2013.01); *G01M 13/04* (2013.01); *G05B 23/00* (2013.01); *G05B 23/0205* (2013.01); *G07C 3/00* (2013.01); *G07C 3/14* (2013.01)

(58) Field of Classification Search
CPC ......... G01M 13/045; G07C 3/00; G01H 1/00; G05B 23/00

USPC ........ 702/34, 35, 56, 183, 185, 189; 384/448; 73/593

See application file for complete search history.

(56) References Cited

U.S. PATENT DOCUMENTS 3,981,584 A 9/1976 Guymer
4,103,229 A 7/1978 Gear
(Continued)

FOREIGN PATENT DOCUMENTS

EP 2014877 A2 1/2009
EP 2273075 A2 1/2011
(Continued)

OTHER PUBLICATIONS

EP Communication, EP 10196610.9-1236 dated Jul. 26, 2011.
(Continued)

*Primary Examiner* — Janet Suglo
*Assistant Examiner* — L. Anderson
(74) *Attorney, Agent, or Firm* — Ingrassia Fisher & Lorenz, P.C.

(57) ABSTRACT

Methods and systems for estimating wear damage of a rolling-element bearing system including at least one rolling-element bearing are provided. A first number of first condition indicators representative of the wear damage of the at least one rolling-element bearing are generated. A second number of second condition indicators are generated based on the first plurality of first condition indicators. The second number is less than the first number an indication of the wear damage of the at least one rolling-element bearing is generated based on the second number of second condition indicators.

17 Claims, 19 Drawing Sheets

(51) Int. Cl.
  *G05B 23/02* (2006.01)
  *G07C 3/14* (2006.01)
  *G05B 23/00* (2006.01)

(56) References Cited

U.S. PATENT DOCUMENTS

| | | | |
|---|---|---|---|
| 4,219,805 A | 8/1980 | Magee et al. | |
| 4,302,754 A | 11/1981 | Magee et al. | |
| 4,731,578 A | 3/1988 | Tsaprazis | |
| 5,566,092 A * | 10/1996 | Wang et al. | 702/185 |
| 6,049,381 A | 4/2000 | Reintjes et al. | |
| 6,525,531 B2 | 2/2003 | Forrest et al. | |
| 6,711,523 B2 | 3/2004 | Bechhoefer et al. | |
| 6,711,952 B2 * | 3/2004 | Leamy et al. | 73/579 |
| 7,886,875 B2 | 2/2011 | Shevchencko et al. | |
| 7,895,016 B2 | 2/2011 | Vittal et al. | |
| 8,056,400 B2 * | 11/2011 | Reintjes et al. | 73/64.56 |
| 2002/0140564 A1 | 10/2002 | Danyluk et al. | |
| 2005/0119840 A1 | 6/2005 | Astley et al. | |
| 2007/0137935 A1 | 6/2007 | Craig | |
| 2009/0014245 A1 | 1/2009 | Shevchenko et al. | |
| 2009/0240471 A1* | 9/2009 | Novis | 702/183 |
| 2010/0030492 A1* | 2/2010 | Kar et al. | 702/39 |
| 2010/0076693 A1 | 3/2010 | Liang et al. | |
| 2012/0086445 A1 | 4/2012 | Bradley et al. | |
| 2013/0000376 A1 | 1/2013 | Allam | |

FOREIGN PATENT DOCUMENTS

| | | | |
|---|---|---|---|
| WO | 9836251 A1 | 8/1998 | |
| WO | 0004361 A1 | 1/2000 | |

OTHER PUBLICATIONS

EP Search Report, EP 10196610.9-1236 dated Jul. 13, 2011.
Eaton Electronic Oil Debris Monitoring System; Jul. 2009; URL: http://www.eaton.com/ecm/groups/public/@pub/@eaton/@aero/documents/content/ct_194536.pdf.
Miller, J.L., et al.: In-line Oil Debris Monitor for Aircraft Engine Condition Assessment; 2000; URL: http://www.ewp.rpi.edu/hartford/~ernesto/F2006/EP/Aids/Papers/Figueroa-Rodriguez/Miller.pdf.
Howe, B., et al.; In-line Oil Debris Monitor (ODM) for Helicopter Gearbox Condition Assessment; 1998; URL: http://www.dtic.mil/dtic/tr/fulltext/u2/a347503.pdf9.
EP search report for EP 13169791.4-1603/2672164 dated Feb. 13, 2015.
USPTO Office Action for U.S. Appl. No. 13/901,995 dated Jul. 6, 2015.

* cited by examiner

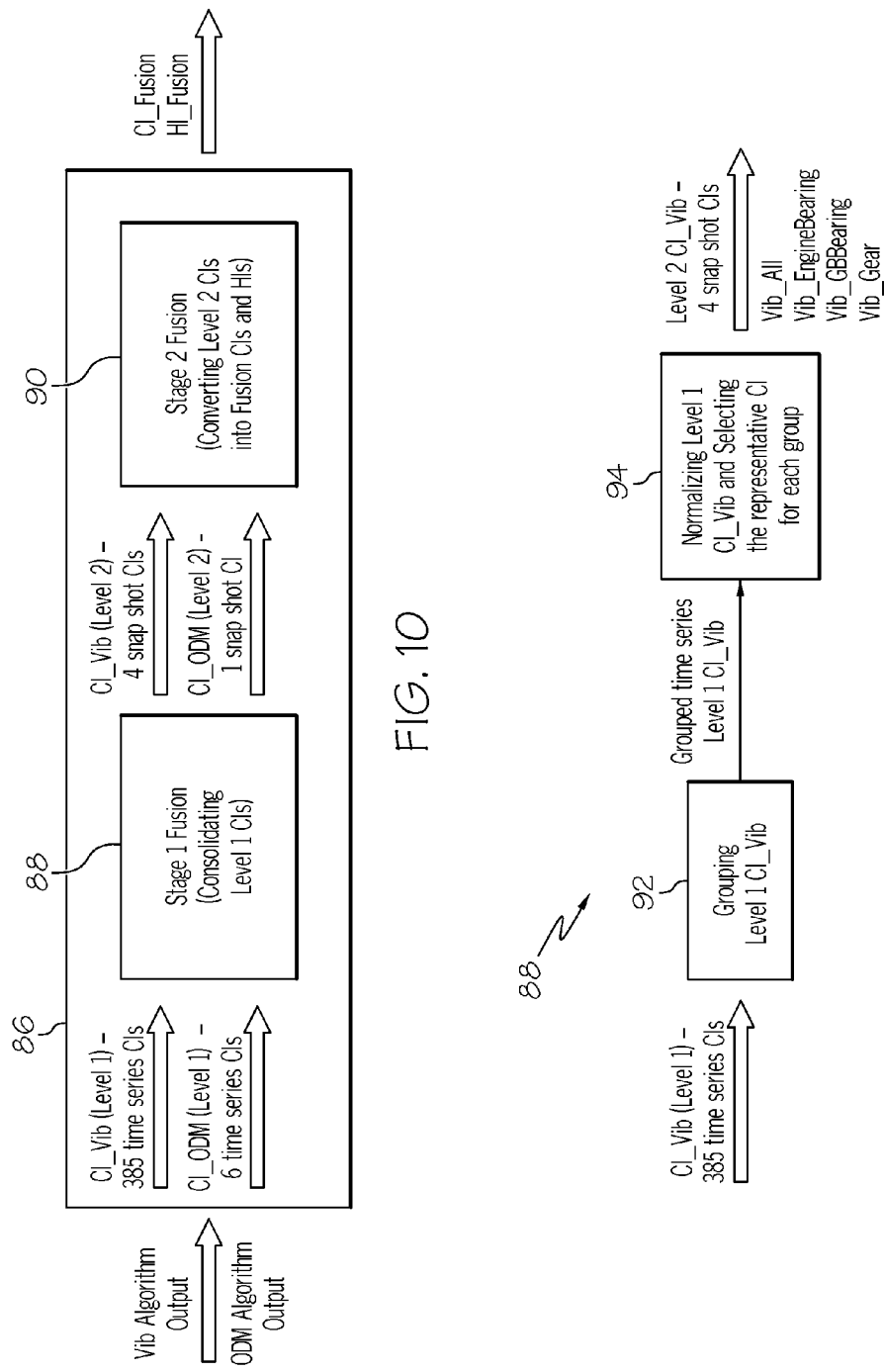

METHOD AND SYSTEM FOR DETECTING INCIPIENT BEARING FAILURES

PRIORITY CLAIM

This application claims priority to U.S. Provisional Patent Application Ser. No. 61/313,370 filed Mar. 12, 2010, which is incorporated by reference herein.

GOVERNMENT RIGHTS

This invention was made with Government support under Contract Bell OSST 6.3 (PO 301287-33) awarded by the Aviation Applied Technology Directorate (AATD). The Government has certain rights in this invention.

TECHNICAL FIELD

The present invention generally relates to rolling-element bearings, and more particularly relates to a method and system for characterizing wear damage on a rolling-element bearing and detecting incipient failures.

BACKGROUND

Rolling-element bearings, such as ball bearings, are used in a wide variety of mechanical and electro-mechanical systems, such as the turbine engines in aircraft. Fatigue wear in rolling-element bearings is a relatively nonlinear phenomenon. Thus, estimating the severity of fatigue wear is difficult, as is providing a robust monitoring service for bearing health and the associated engine maintenance action.

Accordingly, it is desirable to provide an improved method and system for detecting incipient rolling-element bearing failures, as well characterizing and/or estimating wear damage on bearings. Furthermore, other desirable features and characteristics of the present invention will become apparent from the subsequent detailed description and the appended claims, taken in conjunction with the accompanying drawings and the foregoing technical field and background.

BRIEF SUMMARY

In one embodiment, a method for estimating wear damage of a rolling-element bearing system including at least one rolling-element bearing is provided. A first number of first condition indicators representative of the wear damage of the at least one rolling-element bearing are generated. A second number of second condition indicators are generated based on the first plurality of first condition indicators. The second number is less than the first number. An indication of the wear damage of the at least one rolling-element bearing is generated based on the second number of second condition indicators.

In another embodiment, a method for estimating wear damage of a rolling-element bearing system including a plurality of rolling-element bearings is provided. Debris particles within a flow of lubricating fluid in fluid communication with the plurality of rolling-element bearings are monitored. At least one vibration associated with the plurality of rolling-element bearings is monitored. A first number of first condition indicators representative of the wear damage of the plurality of rolling-element bearings are generated based on the monitoring of the debris particles and the monitoring of the at least one vibration. A second number of second condition indicators are generated based on the first plurality of first condition indicators. The second number is less than the first number. An indication of the wear damage of the plurality of rolling-element bearings is generated based on the second number of second condition indicators.

In a further embodiment, a system for estimating wear damage of a rolling-element bearing system including at least one rolling-element bearing is provided. The system includes at least one sensor configured to generate signals representative of conditions indicative of the wear damage of the at least one rolling-element bearing and a processing system in operable communication with the at least one sensor. The processing system is configured to generate a first number of first condition indicators representative of the wear damage of the at least one rolling-element bearing, generate a second number of second condition indicators based on the first plurality of first condition indicators, the second number being less than the first number, and generate an indication of the wear damage of the plurality of rolling-element bearings based on the second number of second condition indicators.

BRIEF DESCRIPTION OF THE DRAWINGS

The present invention will hereinafter be described in conjunction with the following drawing figures, wherein like numerals denote like elements.

FIG. 10 a block diagram of an algorithm for fusing oil debris and vibration condition indicators;

FIG. 11 is block diagram of a first stage of the algorithm of FIG. 10;

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-28 are merely illustrative and may not be drawn to scale.

In accordance with various aspects of the present invention, improved systems and methods for characterizing or estimating wear damage on a rolling-element bearing are provided. In this regard, the present invention may be described herein in terms of functional block components and various processing steps. It should be appreciated that such functional blocks may be realized by any number of hardware, firmware, and/or software components configured to perform the specified functions. For example, the present invention may employ various integrated circuit components, such as memory elements, digital signal processing elements, look-up tables, databases, and the like, which may carry out a variety of functions, some using continuous, real-time computing, under the control of one or more microprocessors or other control devices. Such general techniques and components that are known to those skilled in the art are not described in detail herein.

FIG. 1 to FIG. 28 illustrate methods and systems for characterizing and estimating the wear damage of a rolling-element bearing, as well as for detecting incipient bearing failures. Generally, a first number (or a first set) of first condition indicators (e.g., oil debris condition indicators and vibration condition indicators) representative of the wear damage of the at least one rolling-element bearing are generated. A second number of second condition indicators (e.g., a consolidated set of oil debris condition indicators and vibration indicators) are generated based on the first plurality of first condition indicators. The second number is less than the first number. An indication of the wear damage (e.g., a bearing health indicator) of the at least one rolling-element bearing is generated based on the second number of second condition indicators. In one embodiment, the generation of the indication of the wear damage of the at least one rolling-element bearing is based on a "fuzzy" logic analysis of the second number of second condition indicators.

Figure 1:
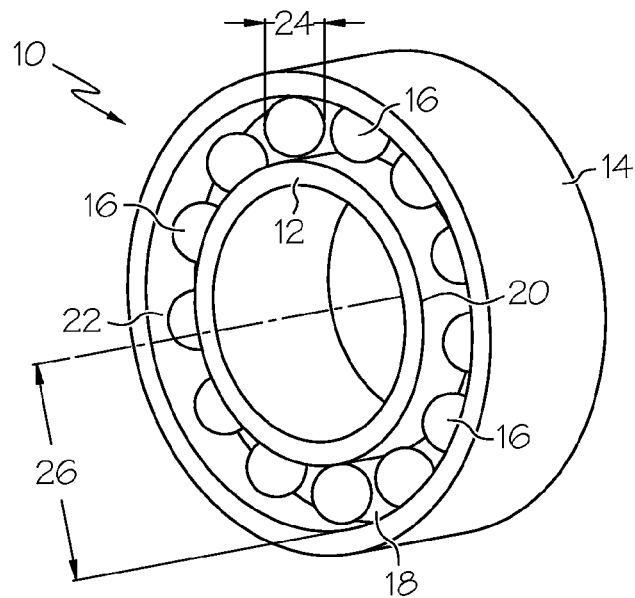
FIG. 1 is an isometric view of a rolling-element bearing according to one embodiment of the present invention.

FIG. 1 illustrates a rolling-element bearing 10, according to one embodiment of the present invention. In the depicted embodiment, the bearing 10 is a ball bearing and includes an inner race 12, and outer race 14, and a plurality of balls (or rolling elements) 16. As shown, the inner and outer races 12 and 14 are substantially circular, annular rings. The inner race 12 is centered within the opening extending through the outer race 14 and is sized relative to the outer race 14 such that a gap 18 lies between an outer surface 20 of the inner race 12 and an inner surface 22 of the outer race 14. As shown, the balls 16 are fit in the gap 18 and sized to make contact with both the outer surface 20 of the inner race 12 and the inner surface 22 of the outer race 14. The balls 16 have a radius 24 of, for example, between 1 millimeter (mm) and 5 centimeters (cm). The bearing 10 has a pitch radius 26, as measured between a center of the bearing 10 and the inner surface 22 of the outer race 14, of between 5 mm and 1 meter (m), as an example. As will be appreciated by one skilled in the art, the rolling-element bearing 10 may be installed in various mechanical systems, such as a turbine engine of an aircraft or any other actuator.

Figure 2:
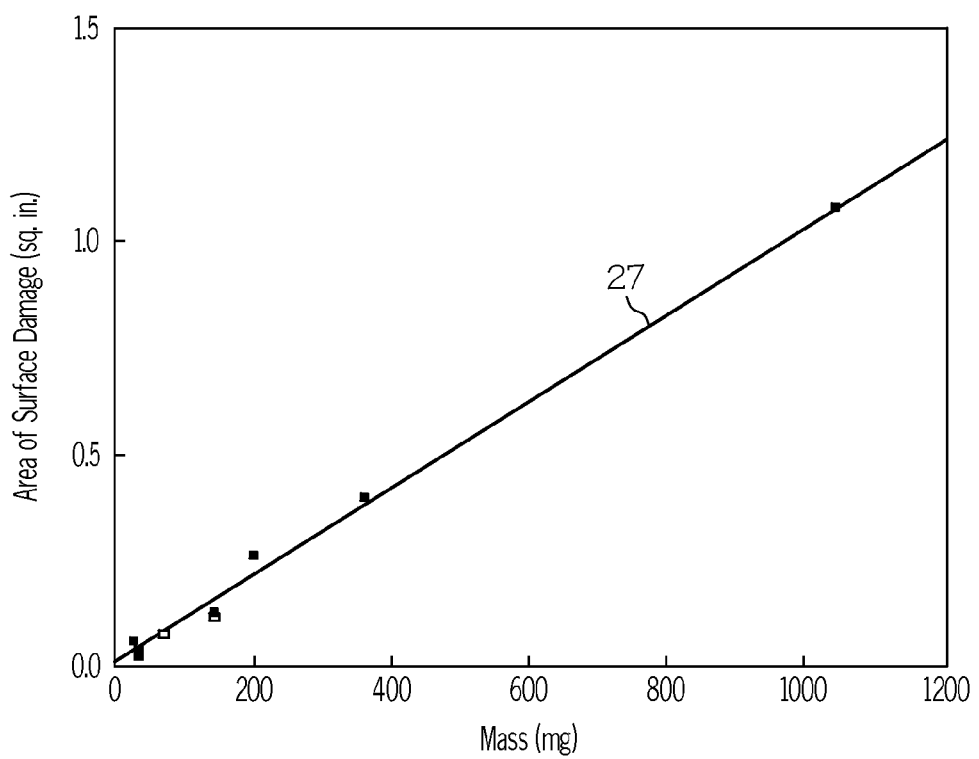
FIG. 2 is a graph illustrating the relationship between the accumulated mass of debris ejected from a bearing during operation and the surface area of the damaged portions of the bearing.

In one embodiment, to generate one or more of the first set of condition indicators, the relationship between the surface area of the damaged (i.e., worn) portions of the bearing 10 and the total mass of the damage particles (e.g., spalls) that are ejected from the bearing during use is utilized to characterize, or estimate, the wear damage of the bearing. FIG. 2 graphically illustrates such a relationship with line 27. As indicated by the linear nature of line 27, the surface area (e.g., in square inches) of the damaged portions (i.e., the vertical axis of FIG. 2) of the bearing is relatively directly proportional to the total accumulated mass (e.g., iron) of the ejected particles (i.e., the horizontal axis of FIG. 2). Such a relationship indicates that after an initial damage feature (e.g., a spall) size, the depth of the damage feature remains constant. Additionally, because of the design of many rolling-element bearings, the widths of the damage features, such as spalls or spall cavities, formed on bearings may be considered to be related to bearing geometry or spall length. As such, the accumulated mass of debris may be directly proportional to the length of the damage features, and vice versa. In other words, as will be described below, the accumulated mass may be used to determine the length of the damage features on the bearing.

In one example, an initial spall depth ($p_{init}$) of 75 micrometers (nm) is assumed, as is a maximum spall depth ($p_{max}$) of 150 μm. Setting the depth of the spall as such simplifies the estimation of the wear damage into solving for a two-dimensional area. Embodiments of the present invention utilize bearing geometry to set thresholds (or Damage Milestones (DMs)) as indicators of the severity of the surface wear. The Damage Milestones quantify the severity in terms of rolling element (ball or roller) size for a given bearing. Table 1 lists the definitions of a set of three such Damage Milestones (DM1, DM2, and DM3), according to one embodiment of the present invention, along with the bearing geometry parameters used in calculations of the Damage Milestones.

TABLE 1

Bearing Damage Milestone Definitions

| Damage Milestone | Spall Length | Spall Width | Spall Depth |
| --- | --- | --- | --- |
| DM1: One ball fits in initial spall depth | Compute using bearing geometry | Proportional to ball radius & spall length | 75 micron |
| DM2: Ball makes 60 deg rotation | Compute using bearing geometry | Proportional to race width and spall length | 150 micron |
| DM3: Two adjacent balls fit in spall | Compute using bearing geometry | Proportional to race width | 150 micron |

Figure 3:
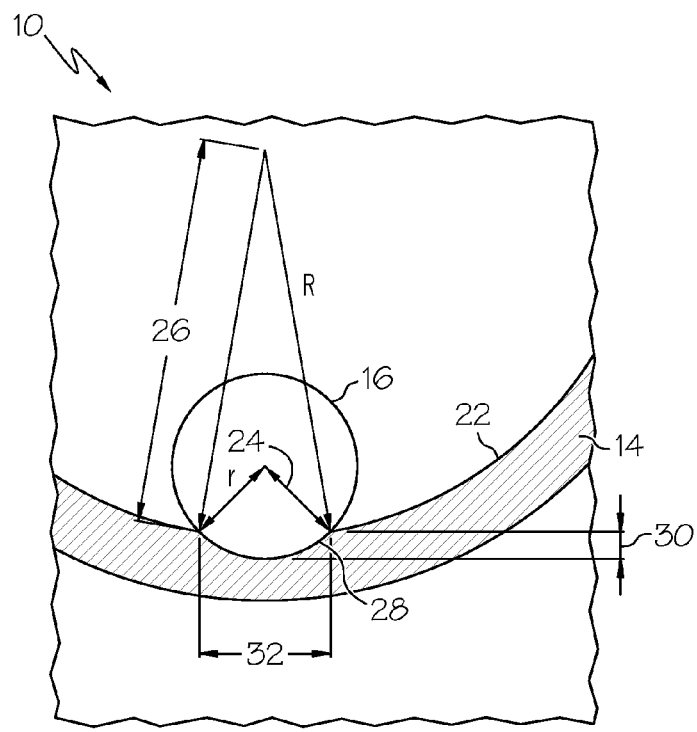
FIGS. 3-5 are cross-sectional views of a portion of the bearing of FIG. 1.
Figure 4:
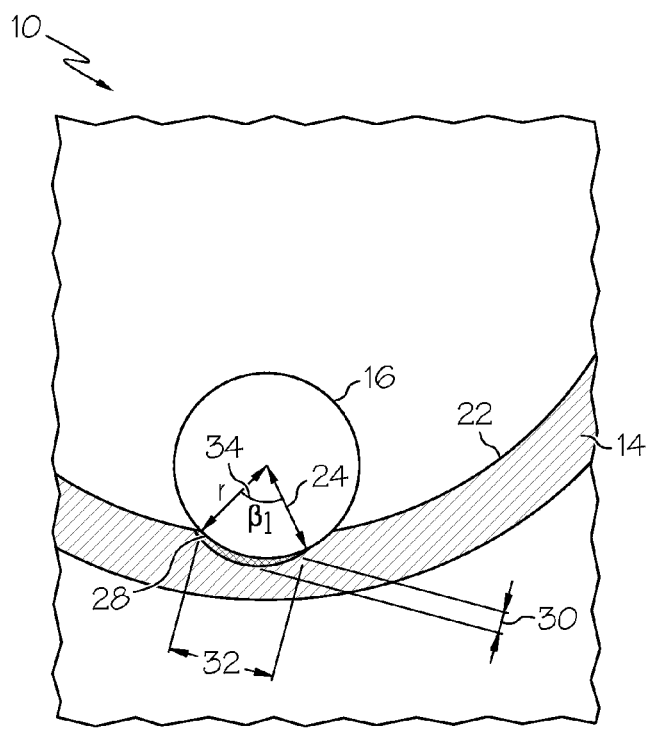
Figure 5:
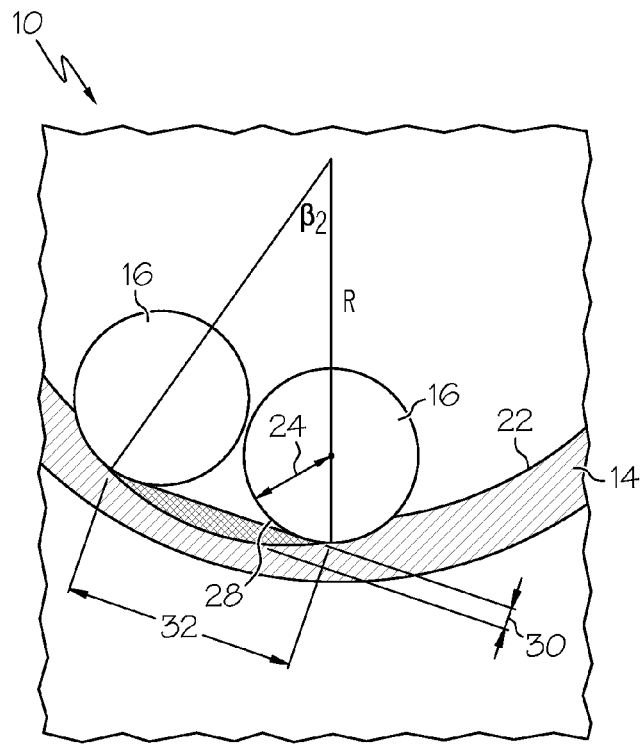

FIGS. 3, 4, and 5 are cross-sectional illustrations of the rolling-element bearing 10 showing various sizes of a spall 28 formed on the inner surface 22 of the outer race 14, in accordance with the Damage Milestones described in Table 1. FIG. 3 illustrates the spall 28 according to DM1. As described above, the depth 30 of the spall 28 is initially assumed to be 75 μm. The size of the spall 28 is determined by the portion of the ball 16 that can fit into the spall 28. As such, the length of the spall ($s_1$) 32 may be expressed $$s_1 = 2\sqrt{2rp-p^2} \text{ and } w_1 \propto (r, s_1), \quad (1)$$

where r is the radius of the ball(s) 24, p is the depth 30 of the spall 28, and $w_1$ is the width (not shown) of the spall 28. As indicated, the width of the spall ($w_1$) is proportional to the radius 24 of the ball 16 and the length 32 of the spall 28. That is, at DM1, the width of the spall 28 may be estimated as ⅔ of the radius 24 of the ball 16 or 3/2 of the length 32 of the spall 28, whichever is smaller.

FIG. 4 illustrates the spall 28 according to DM2. As described above, the depth 30 of the spall 28 is assumed to be 150 μm. The size of the spall 28 in FIG. 4 corresponds to an area covered by the ball 16 during a rotation of an angle ($\beta_1$) 34 of 60 degrees. As such, the length of the spall ($s_2$) 32 at DM2 may be expressed $$s_2 = \pi r/3 \text{ and } w_2 \propto (w_{OR}, s_2), \quad (2)$$

where r is the radius of the ball(s) 24 and $w_2$ is the width (not shown) of the spall 28. As indicated, the width of the spall ($w_2$) is proportional to a width of the outer race ($W_{OR}$) and the length 32 of the spall 28 ($s_2$). The width may be estimated as the minimum of ⅓ of the width of the outer race ($W_{OR}$) and ⅔ of the length 32 of the spall 28 ($s_2$).

FIG. 5 illustrates the spall 28 according to DM3. As described above, the depth 30 of the spall 28 is assumed to be 150 μm. The size of the spall 28 in FIG. 5 corresponds to a spall large enough to include two of the balls 16. As such, the length of the spall ($s_3$) 32 at DM3 may be expressed $$s_3 = 2\left(\frac{\pi R}{N} + r\right) \text{ and } w_3 \propto (w_{OR}), \quad (3)$$

where r is the radius 24 of the ball(s) 16, R is the pitch radius 26 of the bearing 10, N is the total number of balls (or other rolling elements) 16 in the bearing 10, and $w_3$ is the width (not shown) of the spall 28. As indicated, the width of the spall ($w_3$) is proportional (~⅓) to a width of the outer race ($w_{OR}$).

As described above, because of the assumptions made about the width and depth of the spalls, the volume (and/or mass) of the spalls at the Damage Milestones may then be calculated, or vice versa. In one embodiment, the spall length may be determined from the accumulated mass using the accumulated mass and the equations described above.

Figure 6:
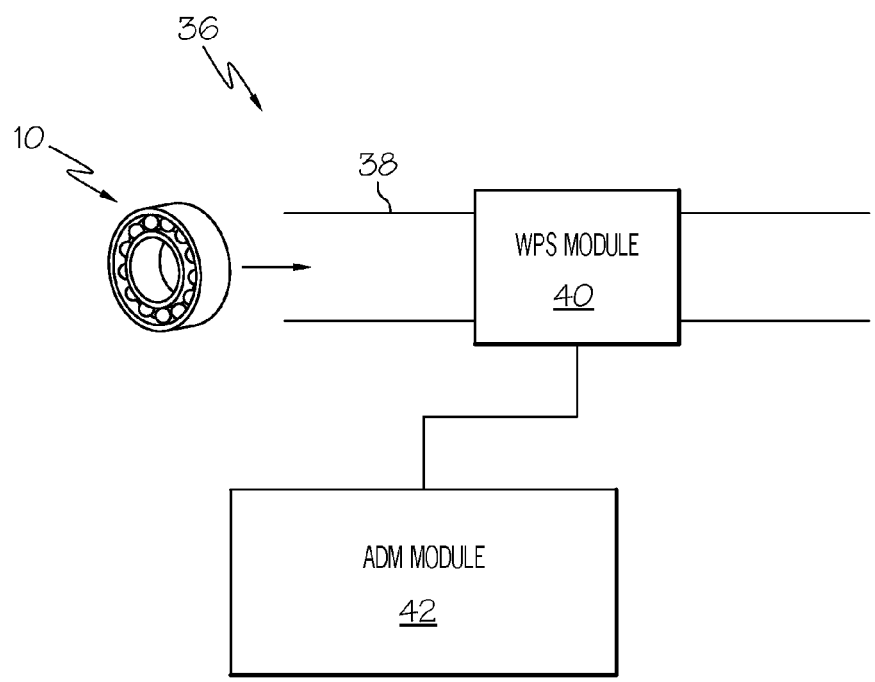
FIG. 6 is a schematic view of a system for characterizing bearing wear damage according to one embodiment of the present invention.

FIG. 6 schematically illustrates a rolling-element bearing system 36, according to one embodiment of the present invention. The system 36 includes the rolling-element bearing 10, a fluid passageway 38, an oil debris monitoring (ODM) module 40, and an Analytical Damage Mapping (ADM) module (or a computing system) 42. As mentioned above, the rolling-element bearing 10 may installed in larger mechanical system, such as a jet turbine engine. As is commonly understood, during operation, the bearing 10 is provided with or immersed in a lubricating fluid (e.g., oil) through a series of channels, such as the fluid passageway (or mainline) 38. As shown the fluid passageway interconnects the bearing 10 and the ODM module 40.

The ODM (or Wear Particle Sensing (WPS)) module 40 is configured to detect damage or wear particles ejected from the bearing 10 during operation and introduced into passageway 38. In one embodiment, the passage of ferromagnetic debris through the module 40 causes disturbances creating an input signal that indicates the debris size. The disturbance created may be, for example, electrical, magnetic, optical, acoustic, or a combination thereof. The ODM module 40 tracks the total amount of accumulated particle debris mass over time.

The ODM module 40 may be implemented using an inline or an online detection technique. In an inline detection approach, a sensing device with debris detection capability is mounted in the mainline of the lubricant flow as shown in FIG. 6. In an online detection embodiment (not shown), the particle sensing device is mounted such that the fluid only periodically passes therethrough (e.g., using one or more valves). In such an embodiment, ODM module 40 may project the accumulated debris mass based on the amount of particles sensed in the analyzed sample lubricant and the associated flow rate.

Figure 7:
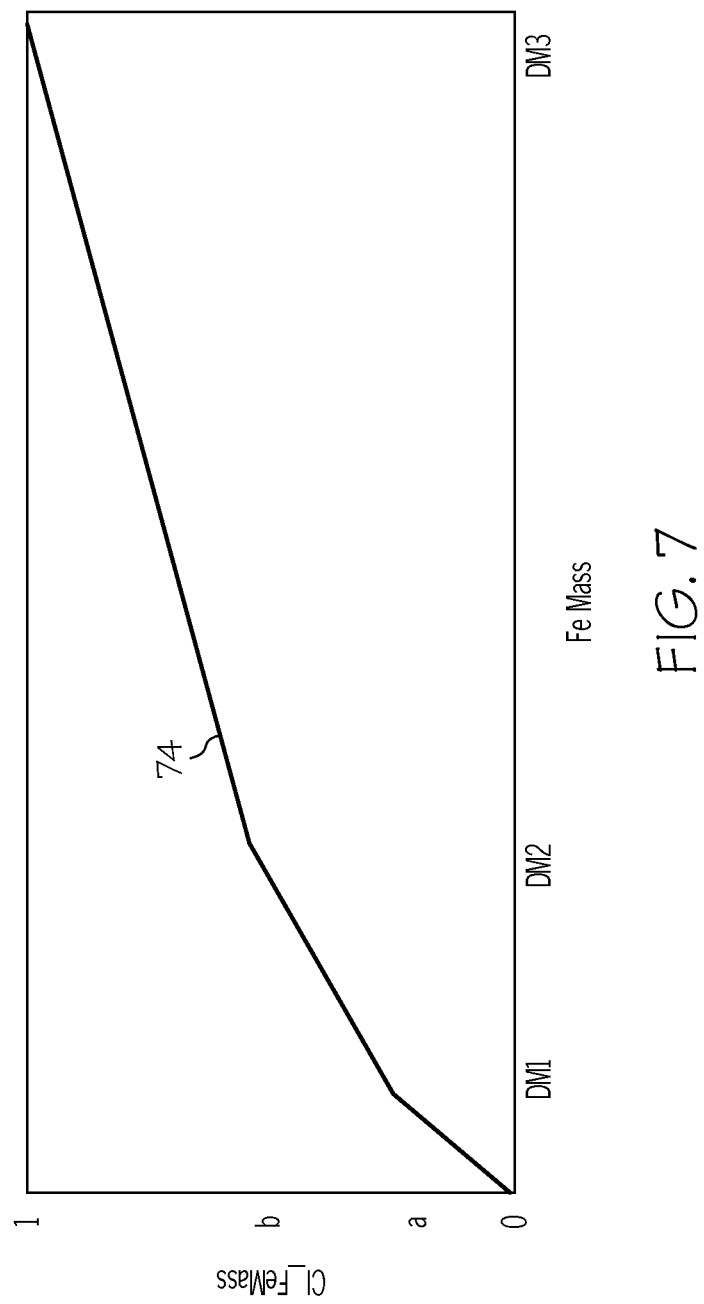
FIG. 7 is a graph illustrating the relationship between the accumulated mass of debris ejected from a bearing during operation and a oil debris condition indicator, according to one embodiment of the present invention.

In accordance with one aspect of the present invention, ADM Module 42 uses Damage Milestones (or other thresholds), such as those described above, to map the accumulated particle mass (e.g., iron (Fe) mass) detected by the ODM module 40 to a bearing condition indicator (CI) as shown in FIG. 7 with line 74. The map may be considered to be a piece-wise linear weighting of the accumulated mass (i.e., the horizontal axis) based on thresholds, such at DM1-DM3, described above. Condition indicators may be considered non-dimensional scalar values that correspond to or represent the amount of wear damage that is present in the bearing according to particular characteristics or readings about the bearings performance (e.g., debris particles). In the embodiment shown in FIG. 7, the weighting accentuates, via a rapid increased in the condition indicator (the vertical axis), an initial small rise in the accumulated mass while gradually scaling back the weighting as the accumulated mass increases. Thus, line 74 is broken into several, linear sections, with the slopes of the sections decreasing as the accumulated mass increases.

One advantage is that the calculation of wear damage (or the condition indicator) described above uses thresholds based upon actual, physical damage levels for a given bearing geometry, rather than arbitrary thresholds. As a result, early detection of surface wear is made possible, as relatively small amounts of wear debris may be accounted for.

According to another aspect of the present invention, condition indicators, such as that described above, are used to generate an overall health indicator (HI) for a rolling-element bearing (or bearing system). One exemplary embodiment first characterizes the bearing damage progression by identifying damage milestones based on bearing geometry (as described above). In one example, for each damage milestone, from the first to the last, appropriate condition indicators are derived and the nonlinear damage progression is modeled as a function of these indicators.

Using oil debris monitoring, such as that described above, one condition indicator used is based on particle count and size to detect the onset of a spallation while effectively ignoring debris "fuzz." An additional condition indicator is based on particle accumulation rate and was developed to quantify burst of particles after the initiation of a spall(s) on the bearing. A third condition indicator is based on accumulated particulate mass, used throughout the failure progression, and tuned to the specific stage of the damage evolution.

The condition indicators based on oil debris are complimented with vibration-based (VIB) condition indicators. In one embodiment, more than 300 condition indicators (a first set of, or Level 1, condition indicators) are defined based on vibration signals and bearing geometry. These condition indicators are grouped and processed, or "fused," in a hierarchical manner to produce second level condition indicators (a consolidated second set of, or Level 2, condition indicators) for bearing damage isolation. In one embodiment, a two-stage "fusion" method based on "fuzzy" logic uses the second level condition indicators to generate health indicators. The health indicators may be mapped to on-board and on-ground notices for pilots and maintenance crew. These notices support confirmation of impending failure by external evidence from oil filter analysis. The developed approach facilitates scheduling and coordinating ground logistics for timely maintenance action.

Various thresholds, and other details, may be configurable. For example, the Level 1 oil debris thresholds may be based on bearing geometry (such as described above), debris classification (e.g., small, medium, and large), particle size threshold for fuzz, and/or particle count threshold for spall initiation. Level 2 vibration condition indicator thresholds may be tied to a desired level of isolation by, for example, grouping based on bearing size, by grouping condition indicators.

In one embodiment, the first set (i.e., Level 1) of oil debris condition indicators is generated using a system such as that shown in FIG. 6. In one embodiment, the oil debris is (or damage particles are) grouped using a coarse grouping of particle size: small, medium, and large particles.

The first oil debris condition indicator tracks the total number of medium and large particles (e.g., with a width of more than 350 micrometers). This condition indicator is used as a filter to detect an onset of spall by setting a count threshold below which the debris is considered "fuzz." Mathematically speaking, the count-based condition indicator, g(x), may be expressed $$g(x_c) = \begin{cases} kx_c & \text{if } x_c < \theta_c \\ k\theta_c & \text{if } x_c \geq \theta_c \end{cases}, \quad (4)$$

where $x_c$ is the medium/large particle count, $\theta_c$ is the count threshold, and k is the particle count coefficient.

After the medium/large particle count threshold is attained, the next condition indicator to be used is based on the ferrous particle mass rate. This condition indicator is used to quantify particle bursts commonly seen in the early stages of spall progression. The mass rate is calculated and mapped through a logarithmic function to produce a smooth condition indicator, h(x):

$$h(x_r) = \begin{cases} l\log(x_r - \theta_r + 1) & \text{if } x_r \geq \theta_r \\ 0 & \text{if } x_r < \theta_r \end{cases}, \quad (5)$$

where $x_r$ is the ferrous mass rate, $\theta_r$ is the mass rate threshold, and l is the mass rate coefficient.

The third oil debris condition indicator is based on the total accumulated debris mass and uses the Damage Milestones discussed above to adjust the weighting of debris mass as shown in FIG. 7.

The debris mass CI, f(x) may be expressed as $$f(x_m) = \begin{cases} a\dfrac{x_m}{\theta_{m,1}} & \text{if } x_m < \theta_{m,1} \\ (b-a)\dfrac{(x_m - \theta_{m,1})}{(\theta_{m,2} - \theta_{m,1})} + a & \text{if } \theta_{m,1} \leq x_m < \theta_{m,2} \\ (1-b)\dfrac{(x_m - \theta_{m,2})}{(\theta_{m,3} - \theta_{m,2})} + b & \text{if } \theta_{m,2} \leq x_m < \theta_{m,3} \\ 1 & \text{if } x_m \geq \theta_{m,3} \end{cases}, \quad (6)$$

where $x_m$ is the Fe mass, $\theta_{m,1}$ is the mass threshold based on DM1, $\theta_{m,2}$ is the mass threshold based on DM2, $\theta_{m,3}$ is the mass threshold based on DM3, and a and b are the mass coefficients.

The vibration condition indicators may be generated using a multiple vibration sensors (e.g., accelerometers) which are placed throughout the system being monitored (e.g., an engine). The vibration condition indicator values are calculated from the algorithms and may be used for a final diagnostic or for an intermediate result such as the input to the fusion algorithm.

Figure 8:
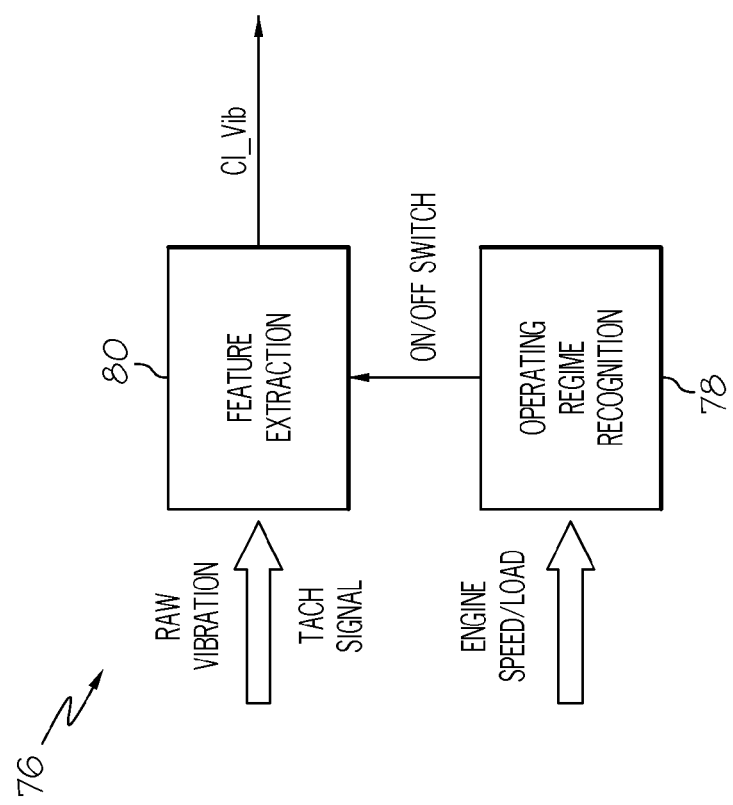
FIG. 8 is a block diagram of an algorithm for generating vibration condition indicators.

FIG. 8 is a block diagram of the vibration algorithm 76, showing the inputs and the computational modules to compute the vibration condition indicators. The vibration algorithm 76 uses a combination of time and frequency domain processes to generate the condition indicators for the gear and bearing failures. The condition indicators are based on the time domain statistical properties and the spectral properties associated with the characteristic frequencies, selected harmonics, and selected side bands.

The vibration algorithm 76 uses certain steady-state conditions that are defined during the algorithm development stage. In the depicted embodiment, the Operating Condition Recognition module 78 monitors torque and speed at any given time during the engine operation and determines if the current engine operating condition matches the designed vibration algorithm processing condition. The Feature Extraction module 80 produces condition indicators for the bearing packs and gears, which are the spectral properties associated with the rotating speed and selected side-bands by polling the vibration sensor.

Examples of vibration condition indicators generated by the Feature Extraction module 80 are shown in Table 2. The first six condition indicators—1R Peak, 2R Peak, Wide-band Bearing Energy 1, Wide-band Bearing Energy 2, Total Bearing Energy, and HF Bearing Energy—are associated with the bearings and are based on the vibration spectrum. The last nine condition indicators—Crest Factor, Energy Ratio, SLF, SI, FM0, FM4, DA1, DA2, and DA3—are associated with the gears and are based on the synchronous time average.

TABLE 2

Summary of Vibration Condition Indicators

| CI Type | CI Description | Units | Frequency |
|---|---|---|---|
| 1R Peak | Magnitude of the highest single peak at the fundamental rotating speed of the shaft as defined by the tachometer | Gpk | 1 per 10 min |
| 2R Peak | Magnitude of the highest single peak at the twice of the fundamental rotating speed of the shaft as defined by the tachometer | Gpk | 1 per 10 min |
| Wide-Band Bearing Energy 1 | RMS of the frequency magnitude around the shaft fundamental rotating speed as defined by the tachometer. This CI includes the energy at the fundamental speed. | Gpk | 1 per 10 min |
| Wide-Band Bearing Energy 2 | RMS of the frequency magnitude around the shaft fundamental rotating speed as defined by the tachometer. This CI excludes the energy at the fundamental speed. | Gpk | 1 per 10 min |
| Total Bearing Energy | RMS of the entire spectrum excluding those at the various shaft fundamental rotating speeds | Gpk | 1 per 10 min |
| HF Bearing Energy | RMS of the spectrum at the higher frequency ranges | Gpk | 1 per 10 min |
| Crest Factor | Synchronous average peak amp divided by RMS level | Non-dim | 1 per 10 min |
| Energy Ratio | Std deviation of difference signal divided by std deviation of regular signal | Non-dim | 1 per 10 min |
| SLF | Amplitude of 1R sidebands divided by Std deviation | Non-dim | 1 per 10 min |
| SI | Sum of largest Nr sidebands divided by the number of sidebands | Non-dim | 1 per 10 min |

TABLE 2-continued

Summary of Vibration Condition Indicators

| CI Type | CI Description | Units | Frequency |
|---|---|---|---|
| FM0 | Peak level of the synchronous signal average divided by the RMS average | Non-dim | 1 per 10 min |
| FM4 | Normalized Kurtosis of the signal average | Non-dim | 1 per 10 min |
| DA1 | RMS of Signal Average | Non-dim | 1 per 10 min |
| DA2 | RMS of Residual Signal | Non-dim | 1 per 10 min |
| DA3 | Peak of envelope divided by RMS of mesh | Non-dim | 1 per 10 min |

Figure 9:
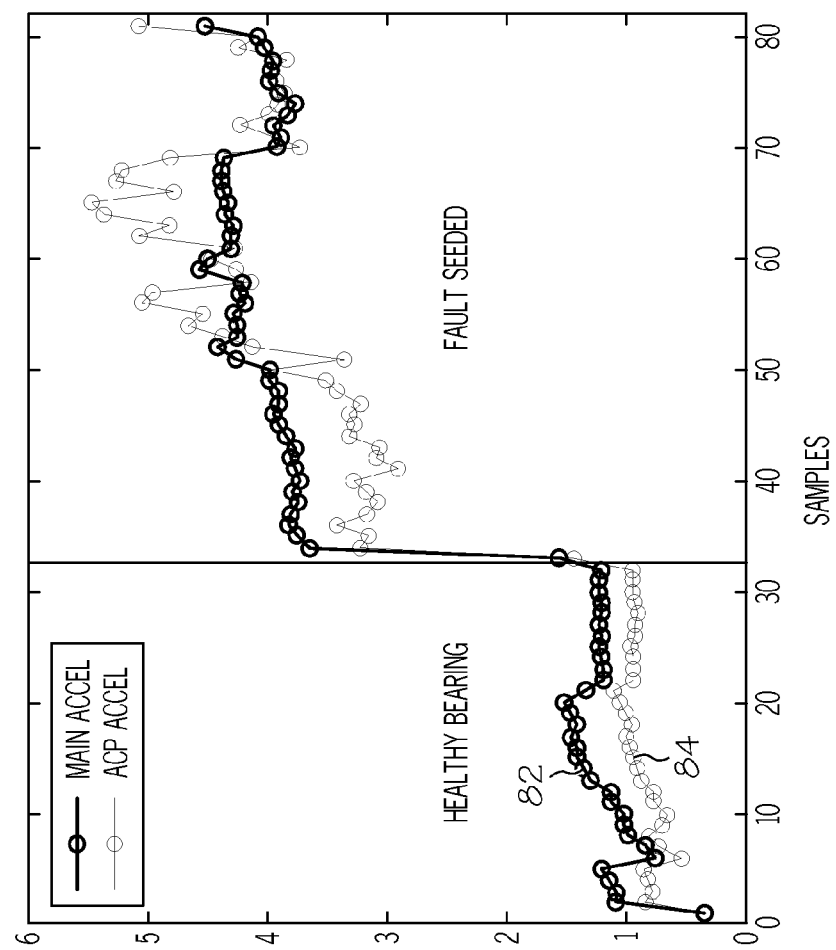
FIG. 9 is a graph illustrating the increase in vibration indicators relative to a fault being seeded on a bearing.

FIG. 9 demonstrates the effectiveness of the vibration condition indicators to detect the fault from the data obtained in a test engine. Two condition indicators 82 and 84 are shown measuring the wide-band bearing energy of the spectrum obtained from two different accelerometers on a turbine engine (i.e., a main accelerometer and an integrated circuit-piezo electric (ICP) accelerometer). The vertical line indicates the time when the fault was seeded by scoring the bearing. Both of the condition indicators 82 and 84 demonstrate clear increases immediately after the fault is seeded. It should be noted here that FIG. 9 shows only the very beginning of the fault initiation. The rig test was continued until the bearing damage progresses further and the vibration condition indicators showed the increases as the damage progresses.

On the rig test, the accelerometers are mounted close to the bearing of interest so that bearing vibrations are transmitted directly to the sensor. There are no other interfering signal sources to drown out the signal of interest. However, in a turbine or jet engine, the bearings are inside the engine casing. Due to the high operating temperatures and the desire to maintain the casing integrity, vibration sensors are mounted on the exterior of the engine casing. Thus, the measured vibration signals of interest are highly attenuated due to the path they travel from the faulted bearing through the engine structure to a sensor mounted externally on the engine casing. Additionally, the engine environment has a variety of other interfering signals such as the noise made by the combustor, air passing through various stages of the engine, and even bearings and gears. Such sound may drown out the signal of interest. Thus, it is expected that the vibration condition indicators on a field-implemented engine may not indicate the fault as clearly in the early stage of the degradation as is the case shown in FIG. 9. Embodiments of the present invention compensate for such issues based on the fusion of the vibration and the oil debris monitoring. By fusing the information from the vibration and oil debris appropriately, the oil debris condition indicators compensate for the relative lack of robustness and sensitively to incipient failures of the vibration condition indicators. Likewise, the vibration condition indicators provide the fault isolation capability as the fault continues to progress.

According to one aspect of the present invention, a diagnostic fusion algorithm combines the condition indicators from the vibration algorithm and the oil debris monitoring algorithm to generate diagnostic health indicators for the bearing and gears. It also outputs the condition indicators (i.e., the final condition indicators) that the health indicator is based on. FIG. 10 is a block diagram of a fusion algorithm 86, according to one embodiment of the present invention. The fusion is performed in two stages. During the first stage 88, the Level 1 condition indicators generated from the vibration algorithm and the oil debris monitoring algorithm are consolidated to generate the Level 2 condition indicators. During the second stage 90, a fuzzy logic analysis, as is commonly understood, is performed on the Level 2 condition indicators to generate diagnostic health indicators and anomaly health indicators. The corresponding Level 2 condition indicators are also provided as output of the diagnostic fusion. The first stage 88 evaluates all condition indicators to provide initial anomaly detection and groups them in order to allow a relatively manageable fuzzy logic algorithm to be used during the second stage 90.

At the first stage 88 of the fusion algorithm, the oil debris monitoring condition indicators are fused together to produce an indicator CI_ODM_Total. This process may be expressed $$CI\_ODM\_Total = f(FeMass) + g(FeCount\_ML) + u(\Sigma h(FeMassRate)), \quad (1)$$

where $\Sigma h(FeMassRate)$ produces the cumulative contribution of the mass rate to CI_ODM_Total, and the function $u(x)$ is used to limit it to the early part of the spall propagation phase by setting it to an identity function if CI_ODM_Total is less than 0.5 (e.g., a "yellow" threshold), or setting it to zero otherwise.

Also at the first stage 88, the Level 1 vibration condition indicators are grouped. Among the vibration condition indicators listed in Table 2, some are more indicative of the health of a certain component and others are more indicative of the health of the overall bearing/gear system. For example, in the case of the bearing system, six different types of the condition indicators are listed in Table 2—1R Peak, 2R Peak, Wide-Band Bearing Energy 1, Wide-Band Bearing Energy 2, Total Bearing Energy, and HF Bearing Energy. Each bearing rotates at different speeds, and among those six bearing related condition indicators, the first four condition indicators—1R Peak, 2R Peak, Wide-Band Bearing Energy 1, and Wide-Band Bearing Energy 2—extract the features from the spectrum around the narrow frequency range associated to the certain rotating speeds. Thus, these four condition indicators are more indicative of the health of a particular bearing, which is useful for fault isolation. The other two condition indicators—Total Bearing Energy and HF Bearing Energy—are more useful for the anomaly detection because they extract information from the very wide frequency range.

Therefore, depending on the frequency components or the synchronous time averages that each, the vibration condition indicators may be grouped according to their target component based on the frequency components or the synchronous time averages. The particular grouping used depends on the desired fault isolation level, as it may be set up to group at the individual bearing/gear level or at a module level. In one embodiment, the grouping is performed with respect to three module levels—'Core Engine Bearings', 'Gearbox Bearings', and 'Gears'. The vibration condition indicators that are not specific to these three modules, such as Total Bearing Energy and HF Bearing Energy, are grouped to 'All', resulting in total of four groups. Once the condition indicators are grouped, they are further processed to produce the condition indicators representing each group. The processing includes a normalization because each Level 1 condition indicator has different scales depending on the type of the condition indicator and the location of the sensor used to generate the condition indicator. The processing also includes a selection of which condition indicator is to represent the health condition of each target component. The vibration condition indicators processed at first stage 88 of fusion to represent each group are the Level 2 vibration condition indicators.

FIG. 11 illustrates the first stage 88 of fusion for the vibration condition indicators, which includes a grouping block (or step) 92 and a normalization/selection block 94. The exemplary test engine included 29 bearings and 14 gears. A total of seven accelerometers were installed at different locations—four on the gearbox, two on the compressor, and one on the power turbine. From these seven sensors, a total of 385 Level 1 condition indicators were generated by the vibration algorithm. The first stage 88 of fusion produces the Level 2 vibration condition indicators, which are four condition indicators representing the health condition of the engine bearings, gearbox bearings, gears, and the engine as a whole.

During the second stage 90 (FIG. 10), the information represented by the vibration condition indicators is fused with that of the oil debris condition indicators. In one embodiment, the second stage 90 of the fusion is based on a "fuzzy" logic, as is commonly understood, which combines evidence to construct the rules that express the health of the bearings/gears and generate fusion (or final) condition indicators and health indicators. Table 3 and Table 4 list the final condition indicators and the health indicators, respectively. Each final condition indicator in Table 3 includes the normalized continuous value indicating the level of the damage and the anomaly. The health indicators in Table 4 are the mapping of the level of the damage and the anomaly indicated by the fusion condition indicators into the maintenance actions represented by, in one embodiment, a color code.

The mapping of the final condition indicators to the health indicators is a one-to-one mapping. For example, the Oil Debris Anomaly health indicator is a mapping of the Oil Debris Level condition indicator, and the Core Engine Bearing Health health indicator is a mapping of the Core Engine Bearing Damage condition indicator. In one embodiment, the health indicators may be represented (e.g., on a display device) as one of three colors: green, yellow, and red. "Green" indicates that there is no evidence of bearing damage or anomalies, and thus, no action is required. "Yellow" indicates that there is enough evidence of bearing damage and anomalies to schedule removal and maintenance on the engine. "Red" indicates that the damage and the anomalies are severe enough to warrant immediate removal. The Oil Debris Anomaly health indicator may also display "blue" when there is initial evidence of an anomaly and a filter analysis should be performed.

TABLE 3

CI Fusion - Condition Indicators Generated by Fusion Algorithm

| CI_Fusion | Units | Frequency |
|---|---|---|
| Oil Debris Level | Non-dim | 1 per download |
| Vibration Level | Non-dim | 1 per download |

TABLE 3-continued

CI Fusion - Condition Indicators Generated by Fusion Algorithm

| CI_Fusion | Units | Frequency |
|---|---|---|
| Gearbox Bearing Damage | Non-dim | 1 per download |
| Core Engine Bearing Damage | Non-dim | 1 per download |
| Gear Damage | Non-dim | 1 per download |

TABLE 4

HI Fusion - Health Indicators Generated by Fusion Algorithm

| HI_Fusion | Units | Description | Frequency |
|---|---|---|---|
| Oil Debris Anomaly | Non-dim | Green (do nothing), Blue (initiate Filter Analysis), Yellow (plan for engine removal), Red (remove engine now) | 1 per download |
| Vibration Anomaly | Non-dim | Green (do nothing), Yellow (plan for engine removal), Red (remove engine now) | 1 per download |
| Gearbox Bearing Health | Non-dim | Green (do nothing), Yellow (plan for engine removal), Red (remove engine now) | 1 per download |
| Core Engine Bearing Health | Non-dim | Green (do nothing), Yellow (plan for engine removal), Red (remove engine now) | 1 per download |
| Gear Health | Non-dim | Green (do nothing), Yellow (plan for engine removal), Red (remove engine now) | 1 per download |

Figure 12:
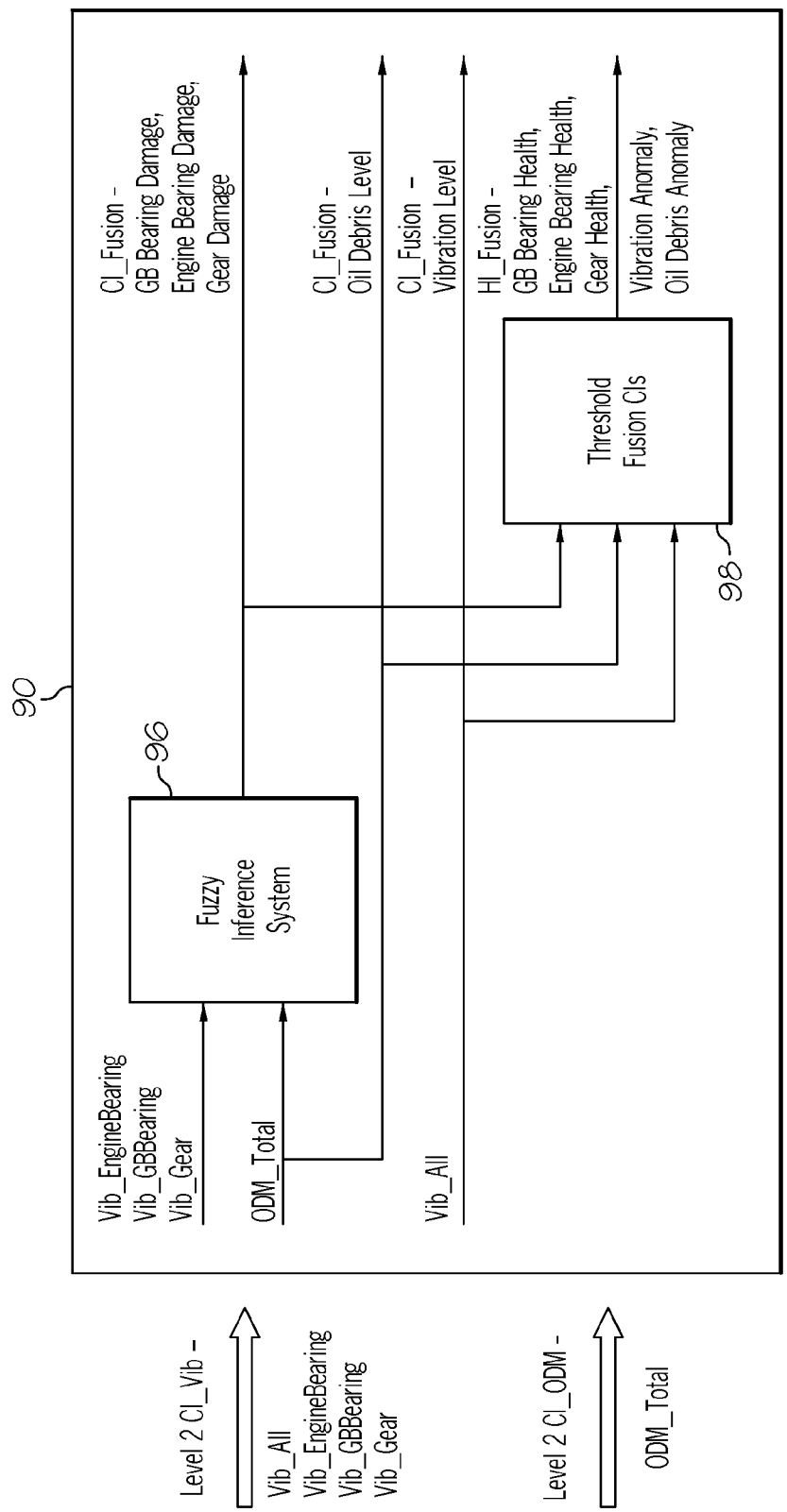
FIG. 12 is a block diagram of a second stage of the algorithm of FIG. 10.
Figure 13:
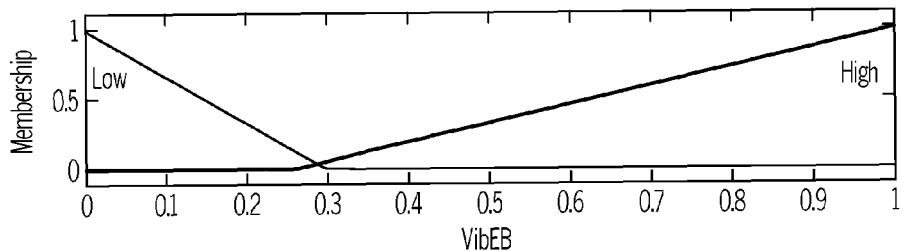
FIGS. 13-19 are graphical illustrations of membership functions for a fuzzy logic analysis used in the algorithm of FIG. 10.
Figure 14:
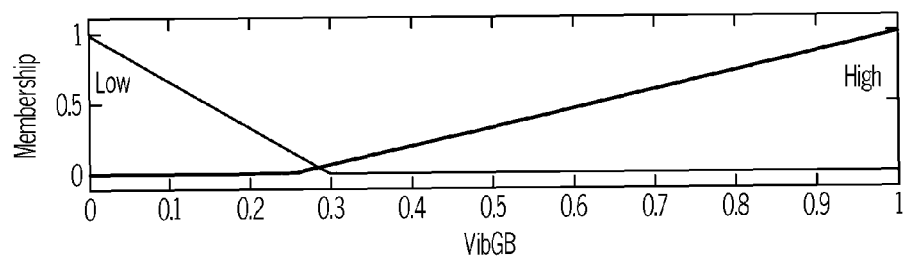
Figure 15:
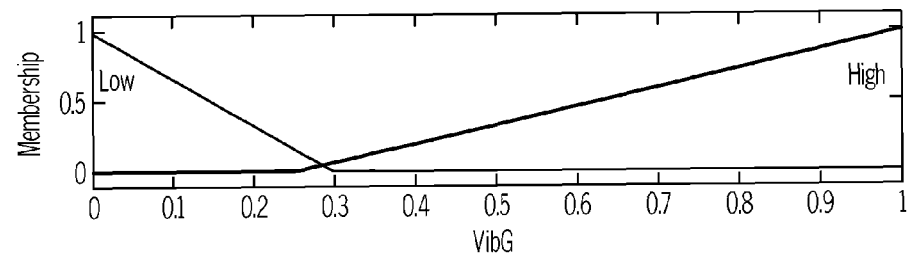
Figure 16:
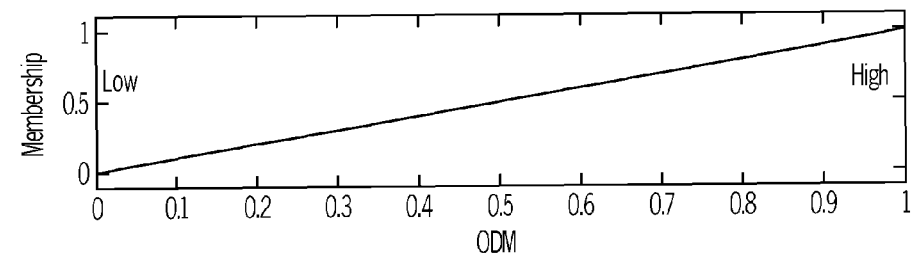

Among the five final condition indicators listed in Table 2, three of them—Gearbox Bearing Damage, Engine Bearing Damage, and Gear Damage—are produced by the fuzzy logic analysis described above. The fuzzy logic analysis may provide fault isolation due to the grouping of the vibration condition indicators performed at the first stage of fusion. No further processing is performed on the other two final condition indicators—Oil Debris Level and Vibration Level. That is, they are the same as their corresponding Level 2 condition indicators, which are ODM_total and Vib_All, respectively. These two condition indicators are based on the symptoms that are not isolatable to the target components. Thus, they provide an indication of an overall system anomaly rather than the diagnostic indication specific to particular components. The details of how the second stage 90 of fusion operates are shown in FIG. 12. As shown, the second stage 90 of the fusion includes a Fuzzy Inference Block 96 and a Threshold Fusion Block 98.

Figure 17:
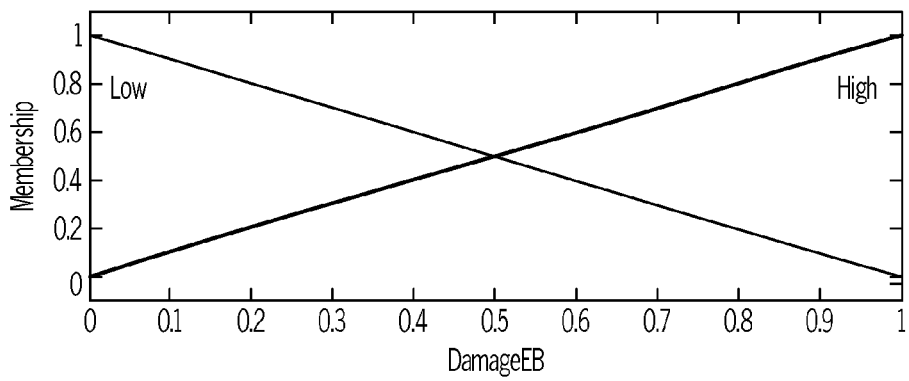
Figure 18:
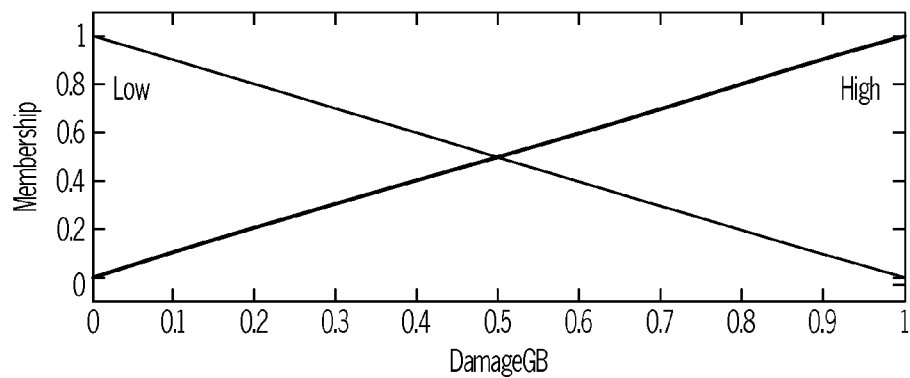
Figure 19:
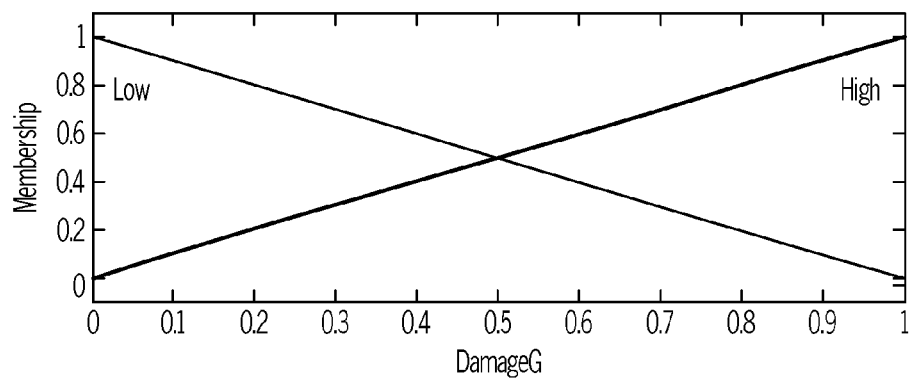

Use of fuzzy logic analysis requires the creation of the fuzzy rules, the design of the membership functions, and the selection of the fuzzy operations, implication operators, aggregation method and "de-fuzzification" method. Table 5 lists the fuzzy rules for the oil debris monitoring and vibration fusion, and FIGS. 13-16 illustrate the membership functions for the inputs and FIGS. 17-19 illustrate the membership functions for the outputs. For the de-fuzzification method, the mean value of the maximum (MOM) is selected.

TABLE 5

Fuzzy System Rules for ODM and Vibration Fusion

| Rule # | IF part | THEN part |
|---|---|---|
| 1 | Vib_EngineBearing Low | Engine Bearing Damage Low |
| 2 | Vib_EngineBearing High AND ODM_Total High | Engine Bearing Damage High |

TABLE 5-continued

Fuzzy System Rules for ODM and Vibration Fusion

| Rule # | IF part | | | | | THEN part | |
|---|---|---|---|---|---|---|---|
| 3 | Vib_GBBearing | Low | | | | GearBox Bearing Damage | Low |
| 4 | Vib_GBBearing | High | AND | ODM_Total | High | GearBox Bearing Damage | High |
| 5 | Vib_Gear | Low | | | | Gear Damage | Low |
| 6 | Vib_Gear | High | AND | ODM_Total | High | Gear Damage | High |

Valuable information was generated by comparing the information obtained from vibration condition indicators, oil debris monitoring condition indicators, and the fusion of the two. The vibration condition indicators provided an immediate indication when the fault was seeded with the vibro-etch tool. For a fault which is initiated by foreign debris in the bearing race, this early indication is very useful.

The oil debris monitoring condition indicators provided the first indication when the fault is initiated by causing material to come loose from the bearing race. In the one test, the oil debris monitoring condition indicators detected the fault 31 hours before the vibration condition indicators.

The fusion of oil debris monitoring and vibration provided useful results when both the oil debris condition indicators and the vibration indicators were providing some indication of a fault, but neither individual indication was at a level high enough to take action. In one test with the main shaft engine bearing, the fused output reached the high confidence threshold 35 hours before the individual condition indicators.

Figure 20:
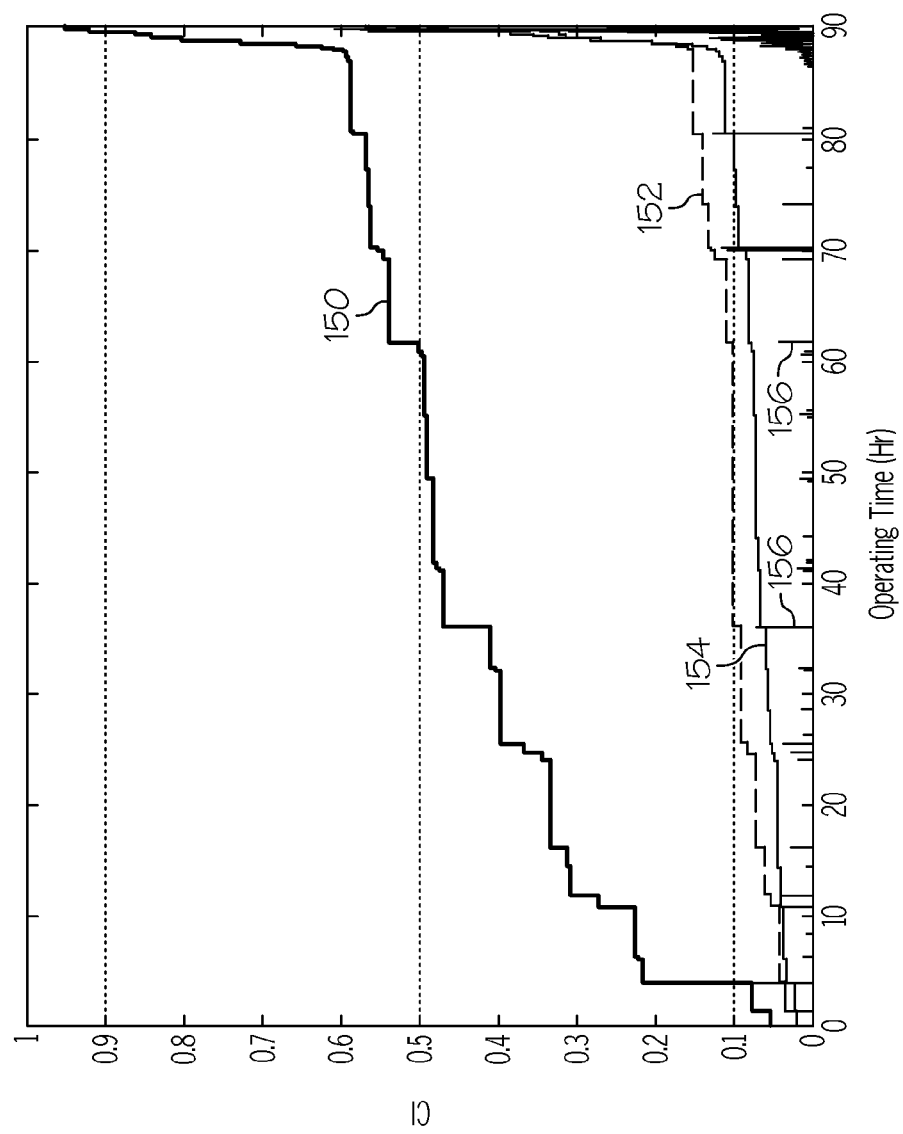
FIGS. 20-25 are graphical illustrations of various results for tests performed using the system described herein.
Figure 21:
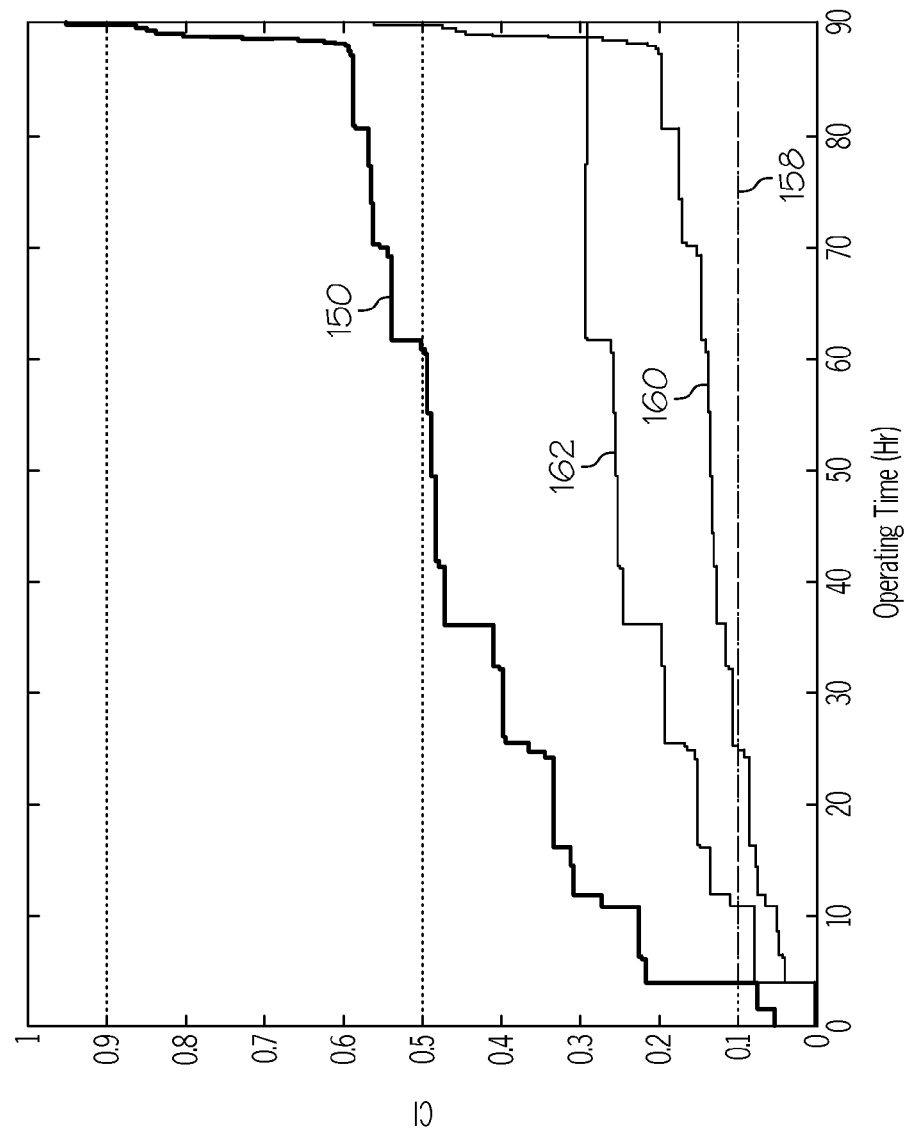

As is shown by the test results discussed below, beyond initial detection, both of the individual technologies have advantages, and the combination of the two helps minimize false alarms. While the oil debris monitoring condition indicators provide a better indication of the magnitude of the fault, the vibration condition indicators provide additional information to help isolate the fault. Further, information fusion from multiple indicators of damage increases the reliability of the decision, which results in the increased true alarm rate and the lowered potential false alarm rate FIG. 20 illustrates a sample Level 2 oil debris monitoring condition indicator 150 and the corresponding raw oil debris measurements (medium/large particle count 152, accumulated iron mass 154, and iron mass rate 156) taken during the test. FIG. 21 compares the same Level 2 oil debris monitoring condition indicator 150 to the Level 1 oil debris monitoring condition indicators (medium/large particle count 158, accumulated iron mass 160, and iron mass rate 162).

Figure 22:
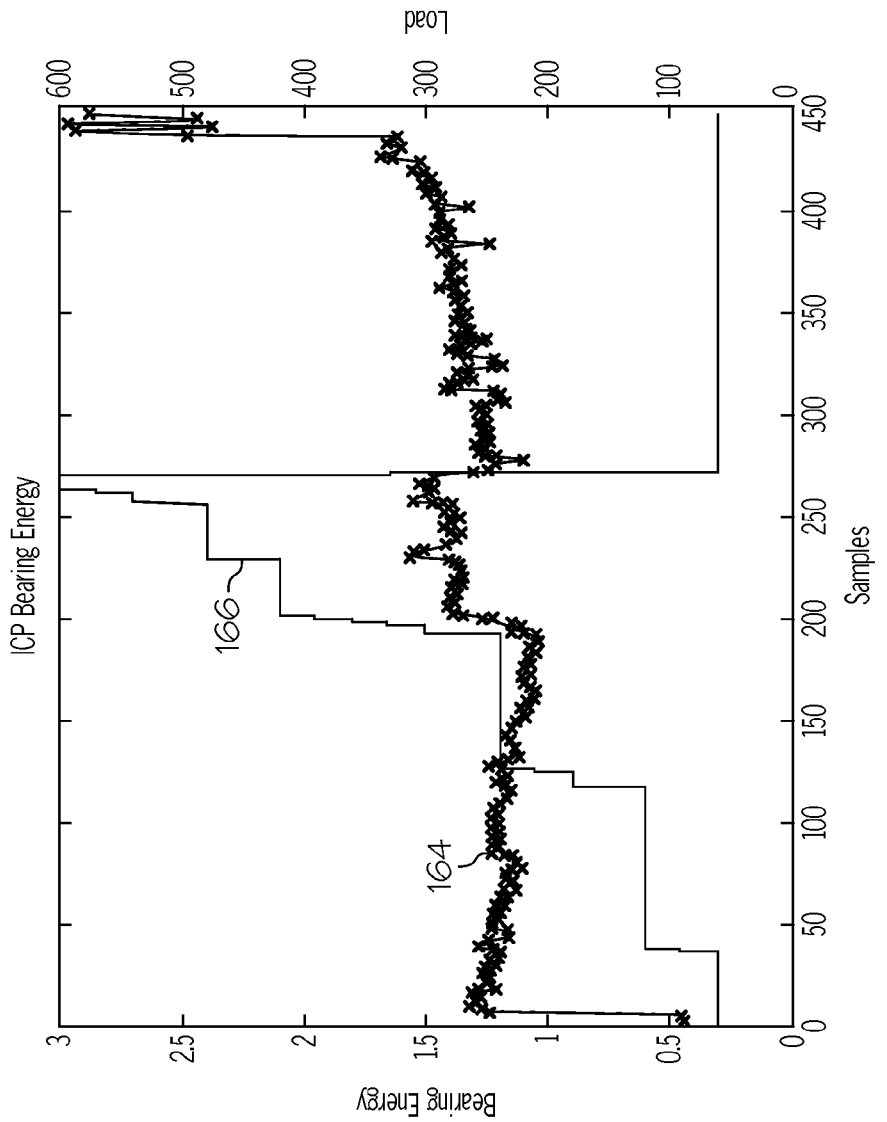
Figure 23:
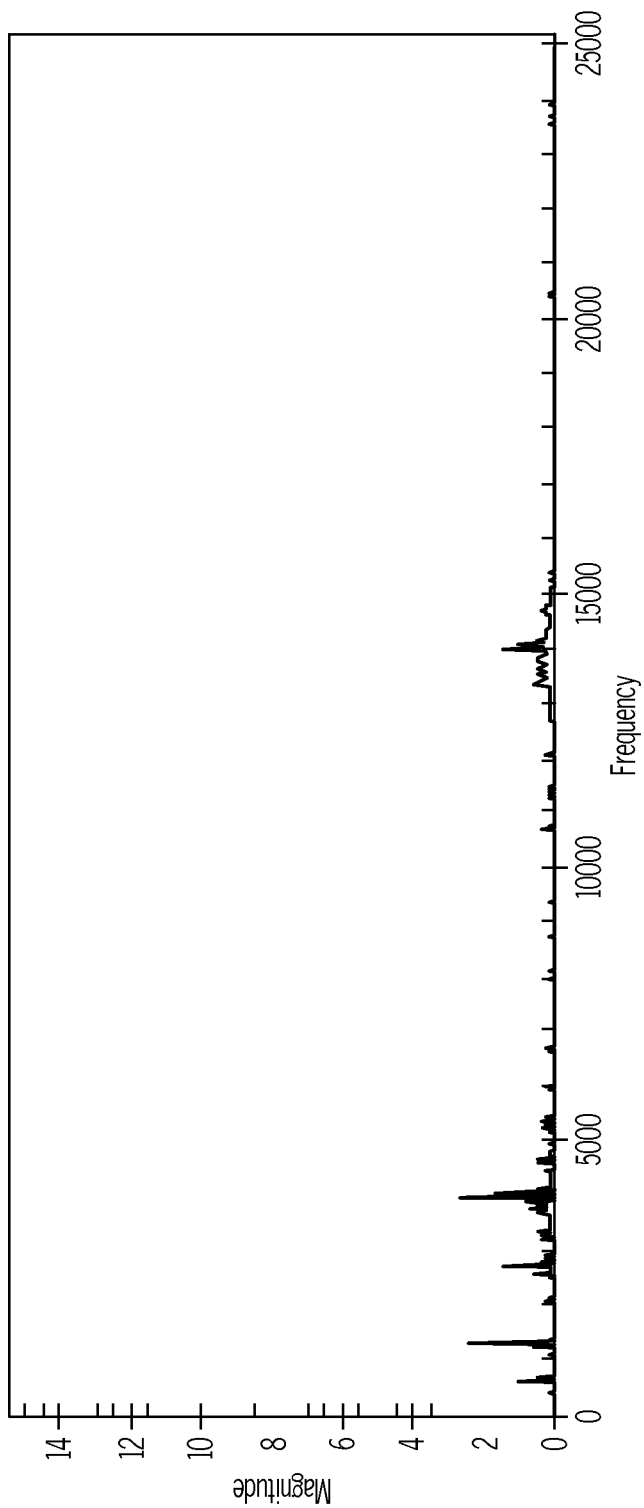
Figure 24:
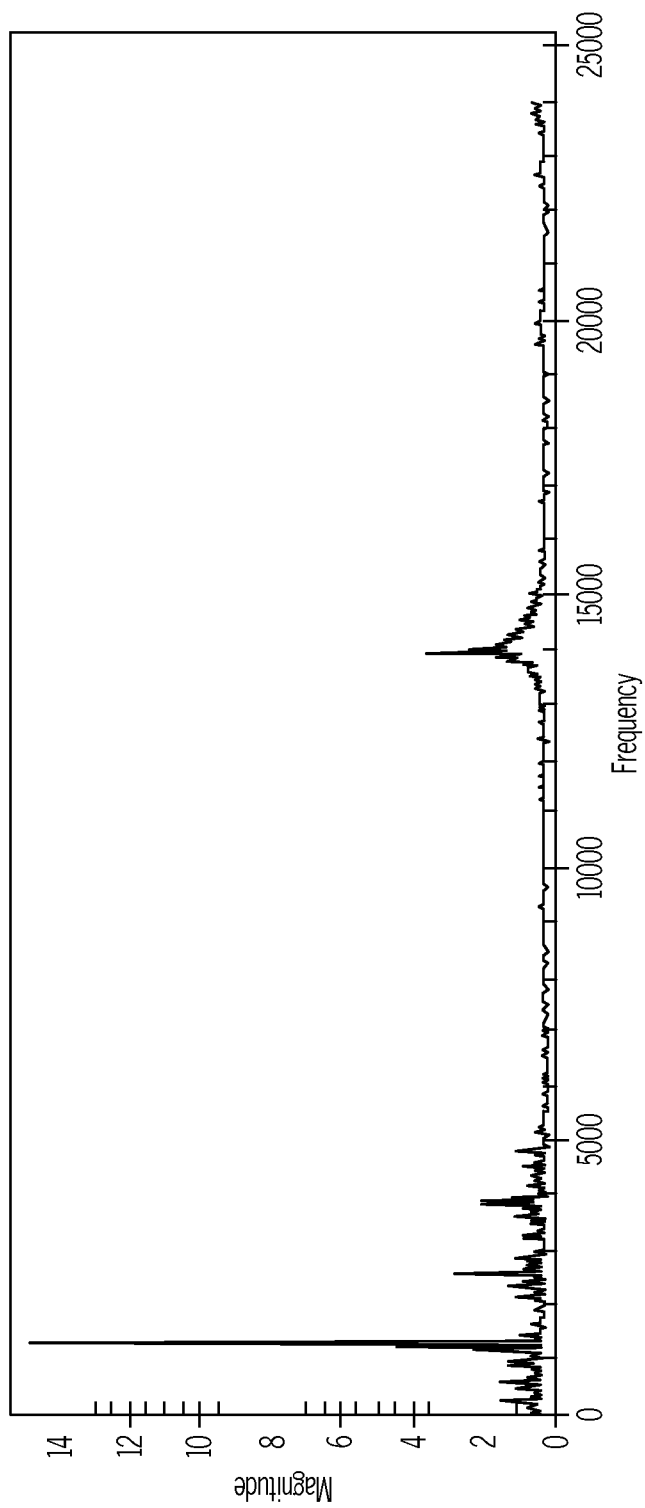

FIG. 22 illustrates a sample Level 1 vibration condition indicator (or bearing energy) 164 and the corresponding radial load 166 throughout the test. The first abrupt increase in the bearing energy 164 occurred immediately after the fault was seeded and demonstrates the corresponding change in vibration level. The level of the bearing energy 164 does not change considerably until the second abrupt jump near the end of the test. FIG. 23 and FIG. 24 illustrate the vibration spectrum after the fault was seeded and at the end of the test, respectively.

Figure 25:
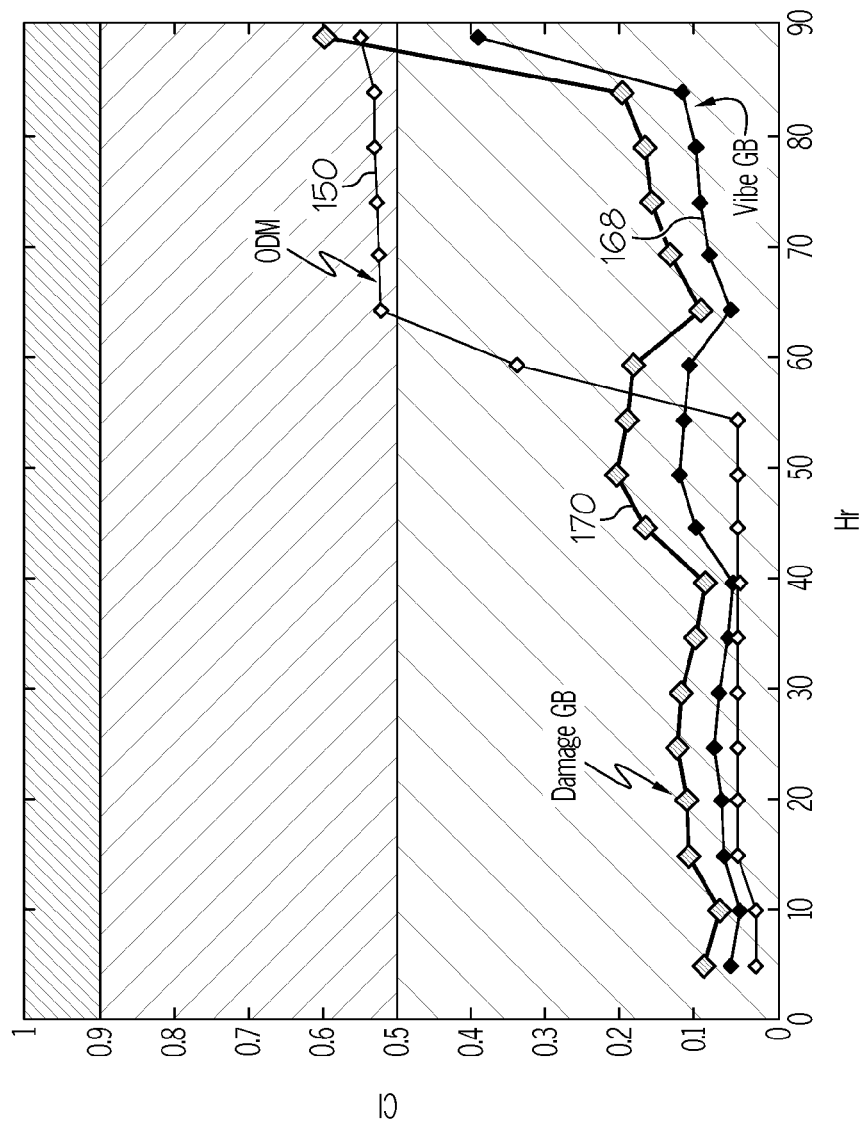

FIG. 25 illustrates the overall results from the fusion algorithm by comparing the Level 2 oil debris monitoring condition indicator (i.e., CI_ODM_Total) 150, the Level 2 gear box bearing vibration condition indicator 168, and the fused condition indicator 170 representing the gearbox bearing damage, which is the output from the fusion of the other two. The test was performed for 90 hours, and the data is segmented with five-hour intervals to simulate a scenario in which the data is downloaded from the engine every five hours. It should be noted that the damage level of the bearing at the end of the test was not significant. The purpose of the rig test was to progress the bearing damage up to a certain point and to install the damaged bearing on an engine and run the test again in the real engine environment.

At around 55 hours, the Level 2 oil debris monitoring condition indicator 150 increases sharply, and at around 60 hours, it reaches its initial threshold to go "blue" (not shown), recommending the oil filter analysis. The Level 2 oil debris monitoring condition indicator 150 continues to increase and reaches "yellow" (e.g., 0.5) after 65 hours, recommending maintenance to plan for the engine removal. The Level 2 gear box bearing vibration condition indicator 168 does not increase significantly until around 85 hours, resulting in the fused condition indicator 170 to remain relatively low until that time. As the Level 2 gear box bearing vibration condition indicator 168 begins to increase around at 85 hours, the fused condition indicator 170 starts to increase and reaches "yellow" at approximately 90 hours. This demonstrates the capability of the oil debris monitoring to detect the onset of the damage relatively early while the vibration level is still low. The vibration condition indicators help isolate the fault, and the fused condition indicator provides the diagnostic information after the damage is confirmed by the vibration condition indicator.

Figure 26:
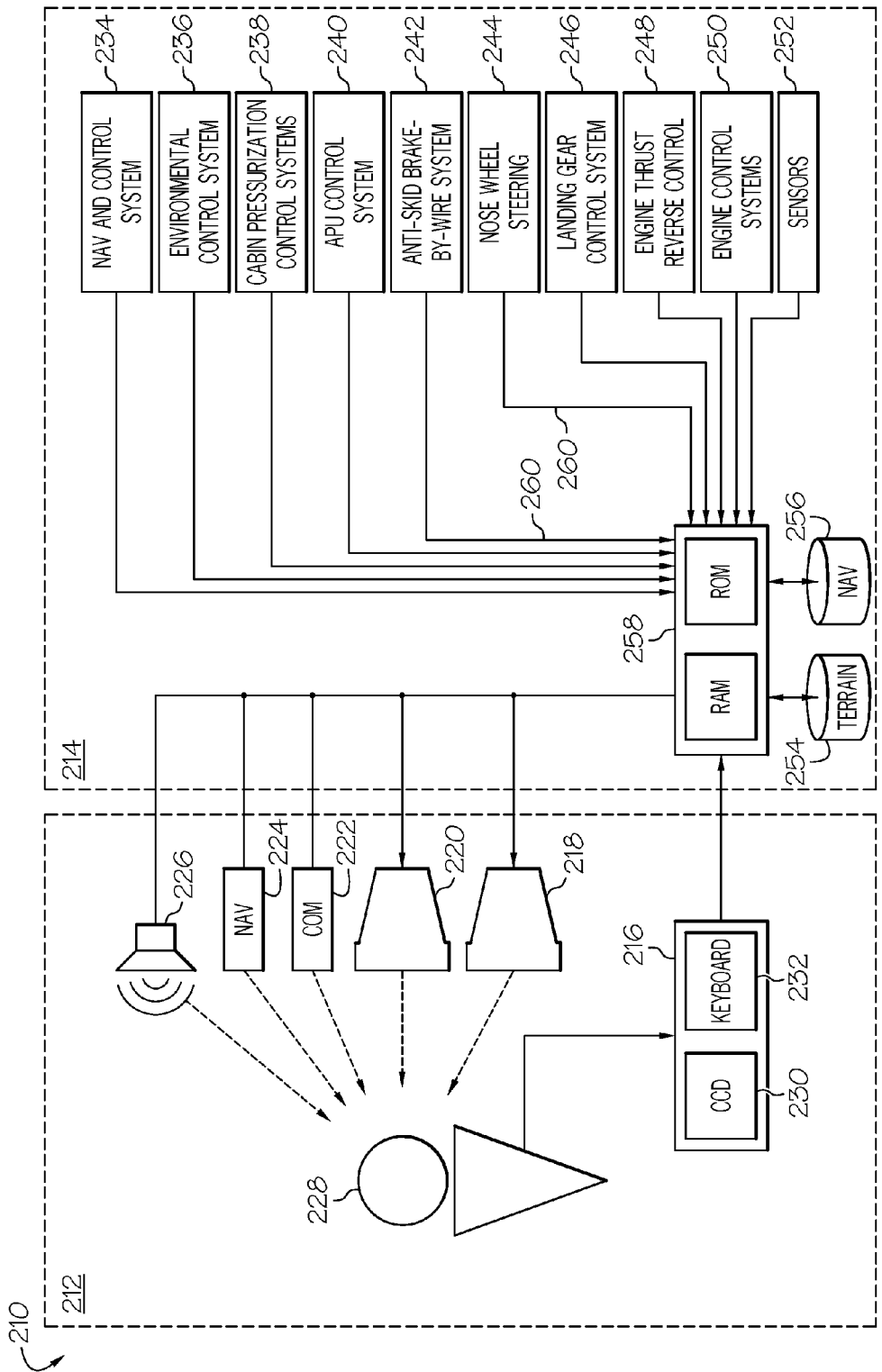
FIG. 26 is a block diagram of a vehicle, according to one embodiment.

FIG. 26 schematically illustrates a vehicle 210, such as an aircraft, in which the methods and systems described above may be implemented, according to one embodiment of the present invention. The vehicle 210 may be, in one embodiment, any one of a number of different types of aircraft such as, for example, a private propeller or jet engine driven airplane, a commercial jet liner, or a helicopter. In the depicted embodiment, the aircraft 210 includes a flight deck 212 (or cockpit) and an avionics/flight system 214. Although not specifically illustrated, it should be understood that the vehicle aircraft also includes a frame or body to which the flight deck 212 and the avionics/flight system 214 are connected, as is commonly understood.

As shown in FIG. 26, the flight deck 212 includes a user interface 216, display devices 218 and 220 (e.g., a display screen for a flight management system (FMS) and a primary flight display (PFD)), a communications radio 222, a navigational radio 224, and an audio device 226. The user interface 216 is configured to receive manual input from a user 228 (e.g., through a cursor control device 230 and a keyboard 232) and, in response to the user input, supply command signals to the avionics/flight system 214.

The avionics/flight system 214 includes a navigation and control system (or subsystem) 234, an environmental control system (ECS) 236, a cabin pressurization control system (CPCS) 238, an auxiliary power unit (APU) control system 240, an anti-skid brake-by-wire system 242, a nose wheel steering system 244, a landing gear control system 246, an engine thrust reverse control system 248, various other engine control systems 250 (which may at least partially include the bearing system 36 shown in FIG. 6), a plurality of sensors 252, one or more terrain databases 254, one or more navigation databases 256, and a processing system (i.e., a central computing system) 258. The various components of the avionics/flight system 214 are in operable communication via sensor inputs (e.g., analog sensor inputs) 260 (or a data or avionics bus).

Although not shown in detail, the navigation and control system 234 may include a flight management system (FMS), an inertial navigation system (INS), an autopilot or automated guidance system, multiple flight control surfaces (e.g., ailerons, elevators, and a rudder), an Air Data Computer (ADC), an altimeter, an Air Data System (ADS), a Global Positioning System (GPS) module, an automatic direction finder (ADF), a compass, at least one engine (in which the bearing 10 may be installed), and gear (i.e., landing gear).

Figure 27:
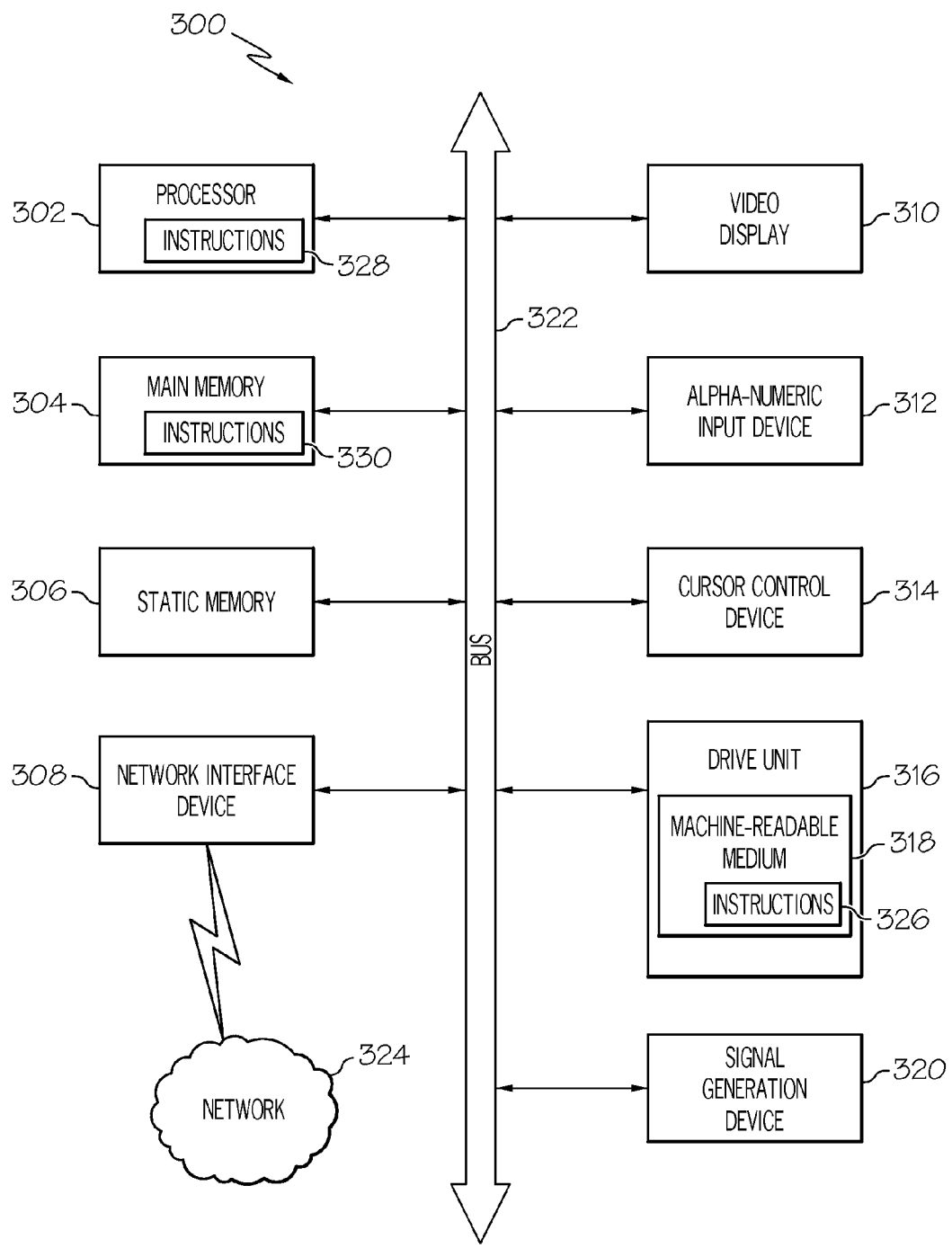
FIG. 27 is a block diagram of a computing system, according to one embodiment.

FIG. 27 schematically illustrates an exemplary computing system 300 (e.g., the ADM module 42 in FIG. 6 and/or the processing system 258 in FIG. 26), according to one embodiment of the present invention. The computing system 300 includes a processor 302, a main memory 304, a static memory 306, a network interface device 308, a video display 310, an alpha-numeric input device 312, a cursor control device 314, a drive unit 316 including a machine-readable medium 318, and a signal generation device 320. All of the components of the computing system 42 are interconnected by a bus 322. The computing system 300 may be connected to a network 324 through the network interface device 308.

The processor 302 may be any one of numerous known general-purpose microprocessors or an application specific processor that operates in response to program instructions. The processor 302 may be implemented using a plurality of digital controls, including field programmable gate arrays (FPGAs), application specific integrated circuits (ASICs), discrete logic, microprocessors, microcontrollers, and digital signal processors (DSPs), or combinations thereof.

The machine-readable medium 318 includes a set of instructions 326, which may be partially transferred to the processor 302 and the main memory 304 through the bus 322. The processor 302 and the main memory 304 may also have separate internal sets of instructions 328 and 330 stored thereon. The various sets of instructions 326, 328, and 330 may include instructions that cause the processor 302 to perform the method(s) described herein. The main memory 304, static memory 306, the machine-readable medium 318, and/or the instructions 328 and 330 may include random access memory (RAM) and read-only memory (ROM), which may include the various information described above related to the particular bearing in use. It will be appreciated that this is merely exemplary of one scheme for storing operating system software and software routines, and that various other storage schemes may be implemented.

The video display (or display device) 310 may be, for example, a liquid crystal display (LCD) device or a cathode ray tube (CRT) monitor. The alpha-numeric input device 312 may be a keyboard and the cursor control device 314 may be a mouse, as commonly understood. The signal generation device 320 may be any device suitable for generating a signal (e.g., visual, audio, textual, etc.) to alert a user of a condition of the bearing with respect to the condition indicators and/or Damage Milestones described above.

Figure 28:
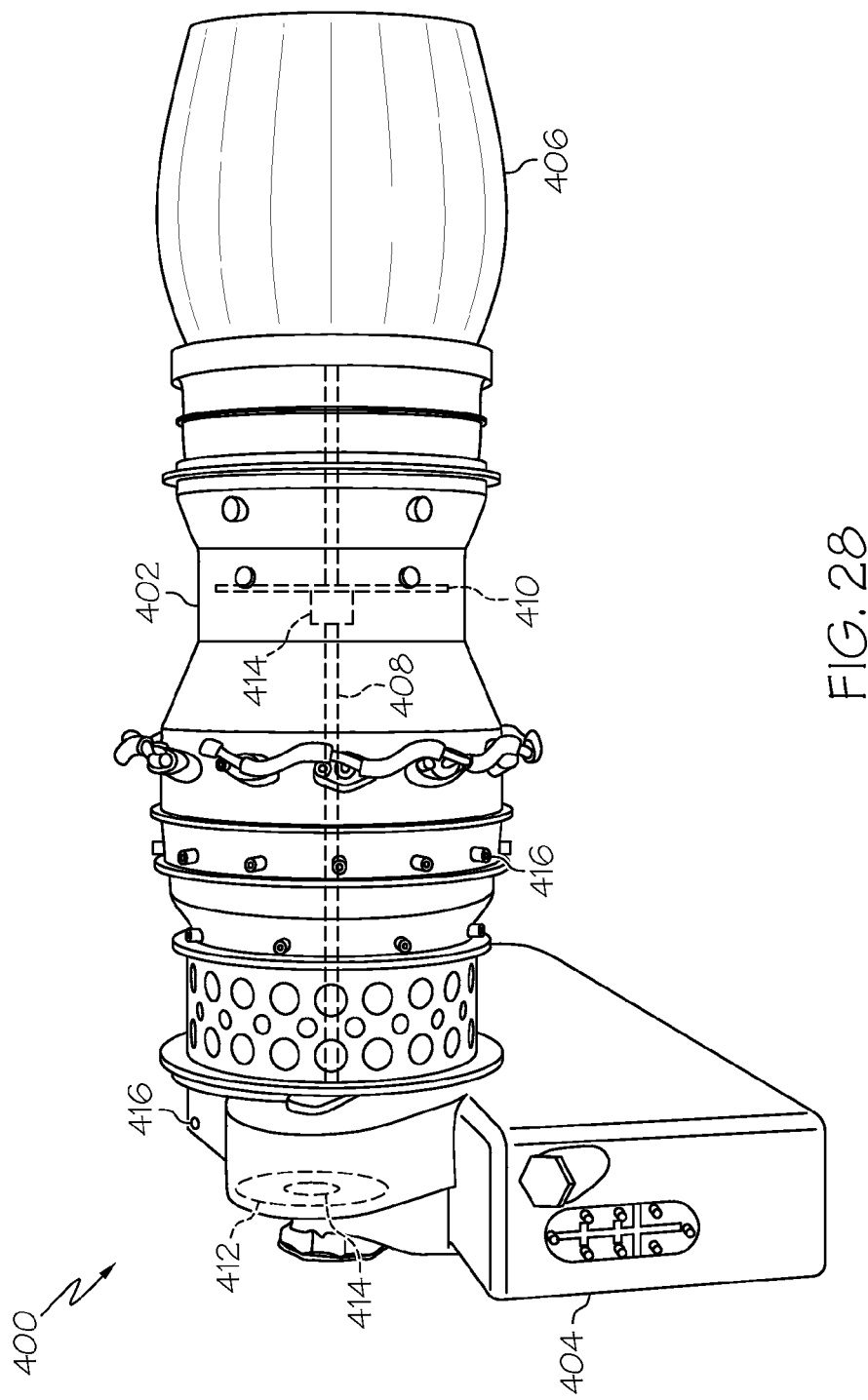
FIG. 28 is a perspective view of a turbine engine, according to one embodiment.

FIG. 28 illustrate a turbine engine 400, according to one embodiment of the present invention. In the depicted embodiment, the turbine engine is a "turboshaft" and includes a turbo machinery casing 402, a gear box 404, and support/mixer assembly 406. The casing 402 has a substantially cylindrical shape and covers various turbo machinery components, such as a shaft 408 and various disks (e.g., compressors and turbines) 410 connected to the shaft, as commonly understood in the art. The shaft 408 is connected to a forward end of the casing 402 and rotatably coupled to a series of gears 412 in the gear box 404. The turbine engine 400 also includes multiple rolling-element bearings 414 supporting the shaft 408, the disks 410, and the gears 412, as well as sensors 416. The sensors 416 include vibration sensors (e.g., micro-electromechanical system (MEMS) accelerometers) and fluid debris monitoring sensors (such as the WPS module 40 shown in FIG. 6).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for estimating wear damage of a rolling-element bearing system comprising at least one rolling-element bearing, the method comprising:

generating, by a processor communicatively coupled to a fluid debris monitoring sensor and a vibration sensor, a first number of first condition indicators representative of the wear damage of the at least one rolling-element bearing, the first number of first condition indicators comprises a first set of fluid debris indicators and a first set of vibration indicators, wherein the first set of fluid debris indicators are generated based on monitoring a flow of fluid in fluid communication with the at least one rolling-element bearing by the fluid debris monitoring sensor and the first set of vibration indicators are generated based on monitoring vibrations associated with the at least one rolling-element bearing by the vibration sensor;

generating, by the processor, a second number of second condition indicators based on the first number of first condition indicators, wherein the second number is less than the first number and at least one of the second condition indicators is based upon a sum of a function of a mass of oil debris, a function of an oil debris count and a function of an oil debris mass rate, and at least one of the second condition indicators is based upon a grouping of normalized vibration data from the vibration indicators based upon which of the at least one rolling-element bearing the vibration data is relevant thereto;

generating, by the processor, an indication of the wear damage of the at least one rolling-element bearing by fusing the second number of second condition indicators into a single indicator; and generating, by a signal generation device communicatively coupled to the processor, an alert based upon the indication of the wear damage generated by the processor, wherein the generating of the indication of the wear damage of the at least one rolling-element bearing is based on a fuzzy logic analysis of the second number of second condition indicators.

2. The method of claim 1, wherein the first set of fluid debris indicators comprises a count of fluid debris particles over a predetermined size, a rate of increase of a mass of the fluid debris particles, a total mass of the fluid debris particles, or a combination thereof.

3. The method of claim 2, wherein the first set of vibration indicators are based on a vibration spectrum of the at least one rolling-element bearing, a synchronous time average of at least one gear, or a combination thereof.

4. The method of claim 3, wherein the second number of second condition indicators comprises a second set of fluid debris indicators and a second set of vibration indicators.

5. The method of claim 4, wherein the generating of the second set of fluid debris indicators comprises performing a summation of the first set of fluid debris indicators.

6. The method of claim 5, wherein the generating of each of the second set of vibration indicators comprises performing a summation of a selected plurality of the first set of vibration indicators.

7. The method of claim 6, wherein the at least one rolling-element bearing comprises a plurality of groups of rolling-element bearings.

8. The method of claim 7, wherein each of the selected plurality of the first set of vibration indicators is associated with one of the plurality of groups of rolling-element bearings or all of the plurality of groups of rolling-element bearings.

9. A method for estimating wear damage of a rolling-element bearing system comprising a plurality of rolling-element bearings, the method comprising:
monitoring, by a fluid debris monitoring sensor, debris particles within a flow of lubricating fluid in fluid communication with the plurality of rolling-element bearings;
monitoring, by a vibration sensor, at least one vibration associated with the plurality of rolling-element bearings;
generating, by a processor communicatively connected to the fluid debris monitoring sensor and the vibration sensor, a first number of first condition indicators representative of the wear damage of the plurality of rolling-element bearings based on the monitoring of the debris particles and the monitoring of the at least one vibration, the first number of first condition indicators comprises a first set of fluid debris indicators and a first set of vibration indicators, wherein the first set of fluid debris indicators are generated based on monitoring a flow of fluid in fluid communication with the at least one rolling-element bearing and the first set of vibration indicators are generated based on monitoring vibrations associated with the at least one rolling-element bearing;
generating, by the processor, a second number of second condition indicators based on the first number of first condition indicators, wherein the second number is less than the first number, and at least one of the second condition indicators is based upon a sum of a function of a mass of oil debris, a function of an oil debris count and a function of an oil debris mass rate, and at least one of the second condition indicators is based upon a grouping of normalized vibration data from the vibration indicators based upon which of the at least one rolling-element bearing the vibration data is relevant thereto;
generating, by the processor, an indication of the wear damage of the plurality of rolling-element bearings by fusing the second number of second condition indicators into a single indicator; and
generating, by a signal generation device communicatively coupled to the processor, an alert based upon the indication of the wear damage generated by the processor.

10. The method of claim 9, wherein the monitoring of the debris particles comprises counting fluid debris particles over a predetermined size, determining a rate of increase of mass of the fluid debris particles, calculating a total mass of the fluid debris particles, or a combination thereof.

11. The method of claim 10, wherein the monitoring of the at least one vibration associated with the plurality of rolling-element bearings comprises monitoring a plurality of characteristics of the at least one vibration, wherein each of the plurality of characteristics of the at least one vibration is based on a vibration spectrum of the plurality of rolling-element bearings, a synchronous time average of a plurality of gears, or a combination thereof.

12. The method of claim 11, wherein the generating of the indication of the wear damage of the plurality of rolling-element bearings is based on a fuzzy logic analysis of the second number of second condition indicators.

13. The method of claim 12, wherein the generating of the second number of second condition indicators based on the first number of first condition indicators comprises performing a summation of the count of fluid debris particles over the predetermined size, the rate of increase of mass of the fluid debris particles, and the total mass of the fluid debris particles.

14. A system for estimating wear damage of a rolling-element bearing system comprising at least one rolling-element bearing, the system comprising:
a fluid debris monitoring sensor configured to monitor debris particles within a flow of lubricating fluid in fluid communication with the at least one of rolling-element bearing;
a vibration sensor configured to monitor at least one vibration associated with the plurality of rolling-element bearing;
a processing system in operable communication with the fluid debris monitoring sensor and the vibration sensor, the processing system being configured to:
generate a first number of first condition indicators representative of the wear damage of the at least one rolling-element bearing, the first number of first condition indicators comprises a first set of fluid debris indicators and a first set of vibration indicators, wherein the first set of fluid debris indicators are generated based on monitoring a flow of fluid in fluid communication with the at least one rolling-element bearing by the fluid debris monitoring sensor and the first set of vibration indicators are generated based on monitoring vibrations associated with the at least one rolling-element bearing by the vibration sensor;
generate a second number of second condition indicators based on the first number of first condition indicators, wherein the second number is less than the first number, at least one of the second condition indicators is based upon a sum of a function of a mass of oil debris, a function of an oil debris count and a function of an oil debris mass rate, and at least one of the second condition indicators is based upon a grouping of normalized vibration data from the vibration indicators based upon which of the at least one rolling-element bearing the vibration data is relevant thereto; and
generate an indication of the wear damage of the plurality of rolling-element bearings by fusing the second number of second condition indicators into a single indicator, and a signal generation device communicatively coupled to the processor, the signal generation device generating an alert based upon the indication of the wear damage generated by the processor.

15. The system of claim 14, wherein the processing system is further configured such that the first set of fluid debris indicators comprises a count of fluid debris particles over a predetermined size, a rate of increase of a mass of the fluid debris particles, a total mass of the fluid debris particles, or a combination thereof.

16. The system of claim 15, wherein the processing system is further configured such that the first set of vibration indicators are based on a vibration spectrum of the at least one rolling-element bearing, a synchronous time average of a plurality of gears, or a combination thereof.

17. The system of claim 14, wherein the processing system if further configured such that the generating of the indication of the wear damage of the at least one rolling-element bearing is based on a fuzzy logic analysis of the second number of second condition indicators.

* * * * *